(12) United States Patent
Goldberg et al.

(10) Patent No.: US 12,539,613 B2
(45) Date of Patent: Feb. 3, 2026

(54) DETECTION AND MITIGATION OF PREDICTED COLLISIONS OF OBJECTS WITH USER CONTROL SYSTEM

(71) Applicant: INTUITIVE SURGICAL OPERATIONS, INC., Sunnyvale, CA (US)

(72) Inventors: Randal P. Goldberg, San Mateo, CA (US); Matthew Cavalier, San Jose, CA (US); Cedric Schwab, San Jose, CA (US); Pushkar Hingwe, Los Altos, CA (US); Lawton N. Verner, Saratoga, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 140 days.

(21) Appl. No.: 18/042,047

(22) PCT Filed: Oct. 14, 2021

(86) PCT No.: PCT/US2021/055080
§ 371 (c)(1),
(2) Date: Feb. 17, 2023

(87) PCT Pub. No.: WO2022/081908
PCT Pub. Date: Apr. 21, 2022

(65) Prior Publication Data
US 2023/0302650 A1  Sep. 28, 2023

Related U.S. Application Data

(60) Provisional application No. 63/092,436, filed on Oct. 15, 2020.

(51) Int. Cl.
B25J 9/16 (2006.01)
A61B 34/35 (2016.01)
B25J 13/06 (2006.01)

(52) U.S. Cl.
CPC ............. B25J 9/1689 (2013.01); A61B 34/35 (2016.02); B25J 9/1676 (2013.01); B25J 13/06 (2013.01)

(58) Field of Classification Search
CPC ........ B25J 9/1676; B25J 9/1689; B25J 13/08; B25J 9/1633; B25J 9/1666; B25J 9/1694;
(Continued)

(56) References Cited

U.S. PATENT DOCUMENTS 6,714,839 B2   3/2004   Salisbury, Jr. et al.
8,521,331 B2   8/2013   Itkowitz
(Continued)

FOREIGN PATENT DOCUMENTS

EP        3586782 A1      1/2020
WO   WO-2018057814 A1    3/2018
WO   WO-2020190832 A1    9/2020

OTHER PUBLICATIONS

International Search Report and Written Opinion for Application No. PCT/US2021/055080 mailed Mar. 30, 2022, 22 pages.
(Continued)

Primary Examiner — Khoi H Tran
Assistant Examiner — Alyse Tramanh Tran
(74) Attorney, Agent, or Firm — Artegis Law Group, LLP

(57) ABSTRACT

Implementations relate to detection and mitigation of potential collisions with a user control system. In some implementations, a method includes detecting an object in a sensing field of a sensor of a user control system, and the user control system includes a control input device. The control input device is in a controlling mode in which
(Continued)

manipulation of the control input device activates a function of a manipulator device. The method includes determining that the object is an unidentified object and determining a characteristic of the object including a location with respect to the user control system, a velocity, or a trajectory. The method determines whether the characteristic of the object satisfies a condition corresponding to the characteristic, and exits the controlling mode in response to determining that the object is an unidentified object and that the characteristic satisfies the corresponding condition.

20 Claims, 9 Drawing Sheets

(58) Field of Classification Search
CPC . B25J 13/02; B25J 13/088; B25J 19/06; B25J 9/1697; B25J 13/00; B25J 13/085; B25J 19/023; B25J 9/1664; G05B 2219/40202; G05B 2219/40203; G05B 2219/37567; G05B 2219/39091; G05B 2219/39324; G05B 2219/40132; G05B 2219/40422; G05B 2219/43202; G05B 2219/49158; G05B 2219/40476; G05B 2219/45117
See application file for complete search history.

(56) References Cited

U.S. PATENT DOCUMENTS

| | | | |
|---|---|---|---|
| 8,543,240 | B2 | 9/2013 | Itkowitz et al. |
| 11,154,985 | B1* | 10/2021 | Strauss ................ G05B 19/425 |
| 2009/0024142 | A1 | 1/2009 | Ruiz Morales |
| 2014/0067121 | A1 | 3/2014 | Brooks et al. |
| 2017/0001301 | A1 | 1/2017 | Kamiya |
| 2018/0222050 | A1 | 8/2018 | Vu et al. |
| 2019/0022857 | A1 | 1/2019 | Conus et al. |
| 2019/0118381 | A1 | 4/2019 | Kikkeri et al. |
| 2019/0269476 | A1 | 9/2019 | Bowling et al. |
| 2020/0155252 | A1 | 5/2020 | Diolaiti et al. |
| 2021/0205995 | A1* | 7/2021 | Vu ......................... B25J 9/1666 |
| 2024/0165806 | A1* | 5/2024 | Denenberg ............ B25J 9/1671 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

DETECTION AND MITIGATION OF PREDICTED COLLISIONS OF OBJECTS WITH USER CONTROL SYSTEM

RELATED APPLICATIONS

This application is a U.S. National Stage patent application of International Patent Application No. PCT/US2021/055080, filed Oct. 14, 2021, the benefit of which is claimed and claims the benefit of U.S. Provisional Application No. 63/092,436, filed Oct. 15, 2020, both of which are incorporated by reference herein.

TECHNICAL FIELD

The present disclosure relates generally to operation of devices having instruments mounted to repositionable arms of computer-assisted devices and more particularly to determining registration between instruments on different computer-assisted devices.

BACKGROUND

User control systems allow a user to control functions of various types of mechanisms and instruments. Teleoperated control systems, for example, may allow a user to control functions or movement of a separate device (e.g., a follower device that is also called a "slave device" in industry, such as a manipulator system) using a control input device (e.g., a leader device that is also called a "master device" in industry). In some examples, teleoperated medical systems (e.g., surgical systems) can provide a user control system with a control input device, where manipulation of the control input device allows a user to control various types of medical instruments of a separate manipulator system to perform medical procedures (e.g., minimally invasive surgical procedures) for a patient.

In some cases, one or more control input devices may be located at a user control system, such as a control console, operator terminal, workstation, etc. For example, a control input device at the user control system can be physically manipulated by the user in a workspace of the control input device, e.g., moved one or more degrees of freedom to cause a corresponding end effector of the manipulated device to be moved in coordination with the control input device. In some examples, the end effector can be controlled to move in corresponding degrees of freedom, and/or to perform a particular function as directed by commands input at the control input device. The user control system can provide a stable platform for the user to operate the control input device without interference, e.g., provide a stable support, display devices, seat, and rest surfaces during control tasks.

The user control system can also provide physical barriers to protect the workspace of the control input device from accidental or other interference in its operation by people or objects within the same physical environment. However, such barriers may not protect fully against some types of objects that may collide with the user control system. For example, persons, hands, equipment moved nearby, held objects, objects set down within a workspace, etc. may be able to bypass physical barriers and/or collide with a component of the user control system, causing accidental vibration or movement in the system and in the control input device. Such accidental movement of the control input device is generally undesirable during control tasks where movement of the control device controls movement of a manipulator device.

In addition, in some instances, design preferences such as a smaller user control system, a user control system of particular length, width, height, footprint, or other characteristic related to size or shape may be desirable for some systems. For example, in an instance, a design preference may be to reduce the footprint and occupied space of the user control system in a physical environment, or to make the user control system of particular shapes that are more ergonomic for the user. Such design preferences may allow advantages such as more room for other equipment, more flexibility of locations in which to place the user control system within the environment, improved ergonomics, etc. However, such design preferences may be limited by functional requirements for the user control system, may reduce the protection of its control input device(s) from accidental interference by people or objects, etc. As one example, physical barriers to the workspaces of control input devices can be used or retained, but may cause the user control system to be larger and heavier.

SUMMARY

Implementations of the present application relate to detection and mitigation of potential collisions of objects with a user control system. In some implementations, a method includes detecting an object in a sensing field of a sensor of a user control system, and the user control system includes a control input device. The control input device is in a controlling mode in which manipulation of the control input device activates a function of a manipulator device in communication with the user control system. The method includes determining that the object is an unidentified object, and determining a first characteristic of the object, the first characteristic comprising a characteristic selected from the group consisting of a location with respect to (relative to) the user control system, a distance of the object to the user control system (e.g. to a user input device or another component of the user control system), a velocity of the object, a speed of the object, and a trajectory of the object. The method includes determining whether the first characteristic of the object satisfies a condition corresponding to the first characteristic, and exiting the controlling mode in response to determining that the object is an unidentified object and in response to determining that the first characteristic satisfies the condition corresponding to the first characteristic. For example, exiting the controlling mode can cause manipulation of the control input device to not activate the one or more functions of the manipulator device.

Various implementations and examples of the control input device are described. For example, in some implementations, the first characteristics the location of the object with respect to the user control system, the location of the object indicates a distance of the object to the user control system, and the condition includes satisfying a threshold distance to the user control system. In some implementations, the threshold distance to the user control system is a threshold distance to the control input device. In some implementations, the threshold distance to the user control system is a first threshold distance, and the method further includes determining that the object is within a second threshold distance of the user control system larger than the first threshold distance, and causing a warning to be output by an output device of the user control system in response to the object being within the second threshold distance of the user control system. In some implementations, the threshold distance is zero distance; and determining that the location of the object satisfies the threshold distance to the user control system includes determining that the object has collided with the user control system.

In some implementations, the sensing field covers a region of space external to a physical boundary of the user control system. In some implementations, the sensing field covers a workspace of the control input device. In some implementations, the sensing field covers a region of space external to the control input device. In some implementations, the sensor is coupled to a frame supporting the control input device. In various implementations, the first characteristic is the velocity of the object, or in some implementations, the first characteristic is the trajectory of the object. In some implementations, detecting the object includes using a sensor to detect the object, and the sensor is one of an image capture device, a Lidar tracking unit, an optical sensor, or an ultrasound sensor.

In some implementations, determining that the object is an unidentified object includes determining that the object is not a moveable component of the user control system based on sensor data that indicates a spatial position of the moveable component. For example, the moveable component can include at least one of a second control input device or a moveable display unit. The sensor data can be determined from the sensing field of the sensor, and/or the sensor data can be kinematic information from a device sensor coupled to a mechanical member coupled to the control input device.

In some implementations, the first characteristic is the velocity of the object, the condition corresponding to the first characteristic includes satisfying a threshold velocity, and exiting the controlling mode is in response to the object being an unidentified object and the velocity of the object being larger than the threshold velocity. In some implementations, the first characteristic is the trajectory of the object, determining the trajectory includes detecting multiple previous spatial positions of the object over a time period and determining a predicted trajectory of the object based on the multiple previous spatial positions, and exiting the controlling mode is in response to the object being an unidentified object and the control input device intersecting with the predicted trajectory of the object.

In some implementations, the control input device is moveable in one or more degrees of freedom, and the method further includes determining a spatial boundary with reference to the object in response to determining that the object is an unidentified object and determining that the first characteristic does not satisfy the condition corresponding to the first characteristic, and the user control system causes resistance to movement of the control input device into the spatial boundary toward the object. In some examples, the method can further include exiting the controlling mode in response to determining that the control input device has intersected the spatial boundary. In further examples, the user control system causes resistance to movement of the control input device by causing generation of forces applied to the control input device by one or more actuators. In some examples, the spatial boundary has a location based on the velocity of the object. In another example, the user control system outputs a magnitude of forces to resist the movement of the control input device across the spatial boundary, the magnitude based on the velocity of the object. In another example, the spatial boundary has a thickness based on the velocity of the object, and the user control system outputs a varying magnitude of forces to resist the movement of the control input device across the thickness of the spatial boundary.

In some implementations, the first characteristic of the object is the velocity of the object, the condition corresponding to the first characteristic includes satisfying a threshold velocity, and on condition that the velocity of the object is below the threshold velocity, the method determines a spatial boundary with reference to the object, and resisting movement of the control input device into the spatial boundary toward the object. In some implementations, the first characteristic of the object is the trajectory of the object, the condition includes satisfying a threshold range of trajectories, and on condition that the trajectory of the object is outside the threshold range of trajectories, the method determines a spatial boundary with reference to the object, and resists movement of the control input device into the spatial boundary toward the object.

In some implementations, the control input device is mechanically grounded. In some implementations, the control input device is mechanically ungrounded and is tethered to a control unit of the user control system by a cord that transmits communication signals between the control input device and the control unit, or is untethered and configured to communicate with the control unit via wireless signals. In various examples, the control input device includes a handle moveable in one or more degrees of freedom, and/or includes a foot control manipulable via contact with a user's foot.

In some implementations, a method includes detecting an object in a sensing field of a sensor of a user control system, the user control system including a control input device moveable in one or more degrees of freedom. The method includes determining a first characteristic of the object, the first characteristic including a location with respect to the user control system, a velocity, and/or a trajectory, and determining whether the first characteristic of the object satisfies a condition corresponding to the first characteristic. The method includes determining a haptic spatial boundary in the one or more degrees of freedom of the control input device based on the first characteristic of the object in response to determining that the first characteristic satisfies the condition. The method outputs a force on the control input device resisting movement of the control input device into the haptic spatial boundary.

Various implementations and examples of this method are described. For example, in some implementations, the first characteristic includes the location of the object with respect to the control input device, the location of the object indicates a distance of the object from the control input device, and the condition corresponding to the first characteristic includes satisfying a threshold distance to the control input device. In some implementations, the control input device is in a controlling mode in which movement of the control input device in space activates a function of a manipulator device in communication with the user control system, and the method further includes determining that the control input device has moved into the haptic spatial boundary and, in response, exiting the controlling mode, e.g., such that movement of the control input device in space does not activate the function of the manipulator device.

In some implementations, the control input device is in a controlling mode, the first characteristic includes the location of the object with respect to the control input device, the location of the object indicates a distance of the object from the control input device, and the method further includes, in response to the object being within a threshold distance of the control input device, exiting the controlling mode. In response to exiting the controlling mode, movement of the control input device in space does not activate the function of the manipulator device.

In some implementations, the method places the haptic spatial boundary at a location based on the velocity of the object. In some implementations, a thickness of the haptic spatial boundary is defined based on the velocity of the object, and a forces are output to resist the movement of the control input device across the thickness, the magnitude of the forces varying based on a location of the control input device across the thickness of the spatial boundary. In some implementations, the first characteristic of the object is the velocity of the object, the condition corresponding to the first characteristic includes satisfying a threshold velocity, and designating the haptic spatial boundary is in response to the velocity of the object being below the threshold velocity. In some implementations, the first characteristic of the object is the trajectory of the object, the condition corresponding to the first characteristic includes satisfying a threshold range of trajectories, and designating the haptic spatial boundary is in response to the trajectory of the object being outside the threshold range of trajectories. In some implementations, designating the haptic spatial boundary is, at least in part, in response to determining that the object is an unidentified object and that the first characteristic satisfies the condition corresponding to the first characteristic.

In some implementations, a user control system includes a frame, a control input device coupled to the frame, sensor system coupled to the frame, and a control unit coupled to the sensor system. The control input device is in a controlling mode in which manipulation of the control input device activates one or more functions of a manipulator device in communication with the control input device. The sensor system is configured to sense a sensing field that includes a workspace of the control input device. The control unit is configured to perform operations including detecting an object in the sensing field while the control input device is in the controlling mode, determining that the object is an unidentified object, determining that the object is within a threshold distance of the control input device, and in response to the object being determined within the threshold distance, exiting the controlling mode such that the manipulation of the control input device does not activate the one or more functions of the manipulator device.

In some implementations, a user control system includes a frame, a control input device coupled to the frame, a sensor system coupled to the frame, and a control unit coupled to the sensor system. The control input device is moveable in one or more degrees of freedom. The sensor system is configured to sense a sensing region that includes a workspace of the control input device. The control unit is configured to perform operations including detecting an object in a sensing field of the sensor system, determining a first characteristic of the object including a location with respect to the user control system, a velocity, and/or a trajectory, determining whether the first characteristic of the object satisfies a condition corresponding to the first characteristic, and designating a haptic spatial boundary in one or more degrees of freedom of the control input device on the condition that the first characteristic satisfies the condition, the haptic spatial boundary being based on the first characteristic. The operations include outputting a force resisting movement of the control input device into the haptic spatial boundary.

In some implementations, a user control system includes means for activating a function of a manipulator device based on manipulation of the means for activating the function while the user control system operates in a controlling mode between the manipulator device and the means for activating the function. The user control system includes means for detecting an object in a sensing field associated with the means for activating the function, means for determining a first characteristic of the object including a location with respect to the user control system, a velocity, and/or a trajectory. The user control system includes means for determining whether the first characteristic satisfies a condition corresponding to the first characteristic, and means for determining that the object is an unidentified object. The user control system includes means to prevent activating the function of a manipulator device based on manipulation of the means for activating the function of the manipulator device by exiting the controlling mode on the conditions that the object is an unidentified object and the first characteristic satisfies the condition corresponding to the first characteristic.

DETAILED DESCRIPTION

Figure 1:
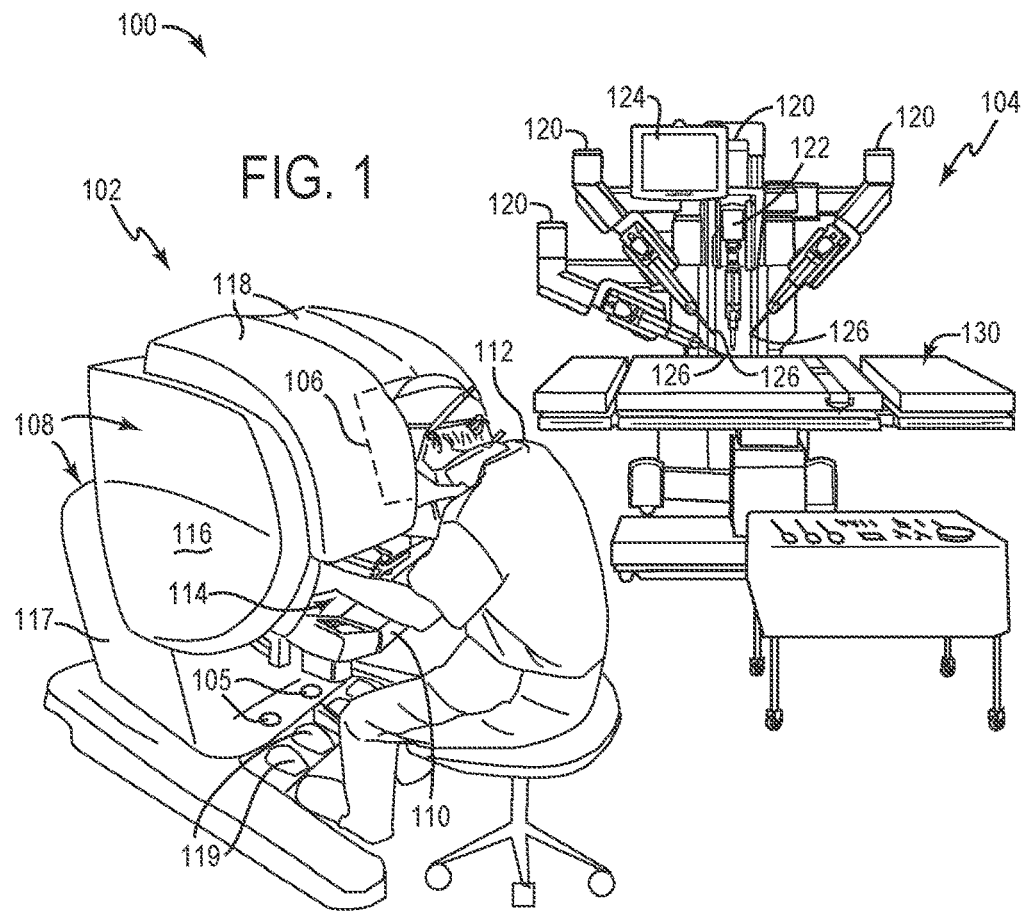
FIG. 1 is a diagrammatic illustration of an example implementation of a teleoperated system which can be used with one or more features disclosed herein, according to some implementations.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an implementation using a surgical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments and implementations. Implementations on da Vinci® Surgical Systems are merely exemplary and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

One or more implementations described herein relate to detection and mitigation of potential collisions of objects with a user control system. In some implementations, a user control system includes a control input device that is in a controlling mode operative to activate a function (such as movement) of a manipulator device based on manipulation of a control input device, and such manipulation can be movement of the control input device in space or other operation of the control input device. An object sensing system of the user control system detects an object in a sensing field using one or more sensors. The system determines a characteristic of the object, such as a location with respect to the user control system, velocity, and/or trajectory, and determines if the characteristic satisfies a condition that corresponds to the characteristic, such as the object being located within a threshold distance from the user control system or moving above a threshold velocity. If the object characteristic satisfies the condition, then the controlling mode is exited such that manipulation (e.g., movement or other operation) of the control input device does not activate the function of the manipulator device.

In various implementations, the controlling mode can be exited if the object is determined to be unidentified, e.g., not a component of the user control system. In some implementations, the controlling mode is exited based on the object's distance to the control input device, or based on the object's distance to a different component of the user control system. In some implementations, the object characteristic satisfies a condition including a trajectory threshold when the object trajectory is determined to be within a threshold range of trajectories directed toward the control input device, or alternatively is directed toward the user control system as a unit (e.g., any component of the user control system).

In various implementations, the sensing fields of the object sensors can cover a workspace of the control input device, and/or can cover spatial regions external to that workspace and/or external to the physical boundary of the user control system. Some implementations can determine and implement a haptic spatial boundary in degrees of freedom of a moveable control input device based on the characteristic of the object. For example, the haptic boundary can be created in response to determining that the object characteristic satisfies a condition corresponding to the characteristic, such as a velocity of the object being below a threshold velocity or the trajectory of the object being outside a range of trajectories directed toward the control input device. In some implementations, the user control system outputs a warning in response to the object being detected at a different distance, e.g., longer distance, from the user control system.

Features described herein provide a user control system with several advantages. Described features can detect the presence of unidentified objects in the vicinity of the user control system and can determine potential collisions of the objects with the user control system. For example, the system can detect if an object moves near or located near to a control input device. In some examples, the system can determine when a hand or other object may potentially collide with a control input device, e.g., in its workspace. In another example, the system can detect when a person (e.g., different than the user) may potentially collide with the user control system. Such collisions may unintentionally manipulate (e.g., move or activate) the control input device, e.g., by causing a user to operate or activate the control input device in an unintentional manner, and/or by directly causing manipulation of the control input device via vibration or other movement of the user control system due to force of the collision. If the control input device is in a controlling mode, this unintentional manipulation may cause inadvertent activation (e.g., movement) of a controlled manipulor device or otherwise interfere with the user control system, and thus such collisions are desired to be avoided.

Furthermore, described features include system actions performed in response to detection of a potential collision, which can prevent or mitigate the effects of such a collision proactively and allow a transition of the system to a safe state. For example, the controlling mode of a control input device can be exited to prevent unintended motion at the control input device from moving a corresponding manipulator device. Feedback such as a warning can be output by the system to potentially avert interference or collision with the user control system before it occurs. In addition, some implementations can use 3-D vision or tracking based sensor systems to accurately detect the potential for collisions of a user control system with objects. Using various described features, a system can reliably and robustly determine to exit a controlling mode and/or perform other functions based on detected potential collisions between the user control system and unidentified objects. Features thus allow a user control system to provide safe and stable operation of control input devices.

Furthermore, described features provide flexibility in the mechanical design of a user control system. For example, some previous control input devices may have been protected by physical barriers (e.g., a "cage" of guard rails and/or ergonomic supports) that reduce the likelihood of an object inadvertently contacting the devices. However, the range of motion of a control input device may be larger than the barriers, such that the barriers limit the range of motion. A larger range of motion is thus enabled by eliminating the barriers surrounding the control input device to enlarge the workspace. In addition, there may be moveable components of the user control system, such as a moveable display unit, that could take advantage of a larger workspace. Such an enlarged workspace can be achieved without increasing the size of the user control system by removing the physical barriers. In addition, the elimination of physical barriers can allow the workspace of control input devices to be larger than the mechanical size of the user control system. In addition, the lack of physical barriers can allow the user control system to be made smaller and lighter, and/or to be placed in locations within a physical environment that may have been impractical for larger systems that include such barriers, e.g., at a side of an operating table or other work site.

The detection and mitigation features described herein can enable the removal of the physical barriers from a user control system and still provide protection to the control input devices against inadvertent collisions with objects. Furthermore, described features can include a dynamic workspace that, e.g., can be resized using configurable haptic spatial boundaries to allow the workspace to occupy as much space as is safe under particular conditions. Thus, described features can allow a user control system to be made smaller and lighter without reducing the size of a workspace of control input devices, and to be operated with reduced concern about outside interference from objects that move or collide with the user control system.

The terms "center," "parallel," "perpendicular," "aligned," or particular measurements in degrees, Hertz, or other units as used herein need not be exact and can include typical engineering tolerances. Some implementations herein may relate to various objects in terms of their state in three-dimensional space. As used herein, the term "position" refers to the location of an object or a portion of an object in a three dimensional space (e.g., three degrees of translational freedom along Cartesian X, Y, Z coordinates). As used herein, the term "orientation" refers to the rotational placement of an object or a portion of an object (three degrees of rotational freedom—e.g., roll, pitch, and yaw around the Cartesian X, Y, and Z axes). As used herein, the term "pose" refers to the position of an object or a portion of an object in at least one degree of translational freedom and to the orientation of that object or portion of the object in at least one degree of rotational freedom (up to six total degrees of freedom).

As referred to herein, a mechanically grounded unit or device is constrained with respect to possible position and orientation motion in a large working environment (e.g., an operating area or room). Also, such a unit is kinematically coupled to the ground (e.g., mechanically supported by a console, supports, or other object attached to the ground). As used herein, the term "proximal" refers to an element that is close to (or closer to) a mechanical ground and the term "distal" refers to an element that is away from (or further from) a mechanical ground.

The term "workspace," as used herein, refers to a volume of space in which a control input device can be moved or activated and the control input device is enabled to control (e.g., provide commands to) a controlled device such as a manipulator device. For example, in some implementations the workspace is defined by the physical limits of movement of the control input device, while in other implementations the workspace is defined in a smaller region within the physical limits of the control input device such that the control input device does not send commands to a controlled device when moved outside the smaller region. In some implementations, the workspace may be a spatial region in which the control input device can be manipulated by a user, e.g., a region above or near a foot pedal device or other input device in which a user's foot or hand may be placed and/or moved to move or activate the device to command functions of the user control system and/or teleoperated system associated with the input device.

The terms "external to the user control system" or "external to the components of the user control system" refers herein to regions of space outside the physical boundary of the components of the user control system, e.g., outside the housing, control input devices, display unit, footrests, etc. of the user control system. The term "external object" refers to an object originating externally to the components of the user control system and not including the components of the user control system.

The term "manipulation" refers to movement, actuation, or other activation of a control input device by a user, by devices (e.g., actuator such as a motor), by movement such as vibration of a user control system connected to the control input device, or by an object that contacts the control input device. Activation of a control input device can include sensing a presence of a user (e.g., a user's hand or foot) to cause the control input device to output a control command, e.g., as with a non-moving control input device such as a capacitive or resistive sensing pad. A moveable control input device can include a control input device that can be moveable in multiple degrees of freedom (e.g., a hand grip device on a gimbal mechanism, a joystick, mouse, trackball, etc.), or a control input device that can be moved in one degree of freedom (e.g., constrained hand grip device, pedal, button, knob, slider, etc.).

FIG. 1 is a diagrammatic illustration of an example teleoperated surgical system 100 which can be used with one or more features disclosed herein. Other types of control systems or master-slave systems can be used in other implementations involving described features. Teleoperated surgical system 100 includes a user control system 102 and a manipulator system 104. In this application, manipulator systems are also called manipulator devices, such that "manipulator system 104" may also be called "manipulator device 104." In various examples, the user control system 102 can comprise a control console or workstation. A control unit (not shown in FIG. 1) can be communicatively coupled to these components, examples of which are described with respect to FIG. 10.

In this example, user control system 102 includes a display device 106 where images of a work site are displayed during an operating procedure using the system 100. For example, the images can be displayed by display device 106 to depict a surgical site during a surgical procedure, e.g., one or more display screens, projectors, etc.

User control system 102 provides control functions for a user to control one or more functions of manipulator system 104. A "user control system" as referred to herein, can include multiple components including one or more control input devices, mechanical arms coupled to one or more of the control input devices, one or more display devices or display units, supports for other components of the user control system, and/or a housing enclosing one or more components of the user control system. For example, a user 112 of user control system 102 can grip one or more hand control input devices. Some examples of control input devices are described with respect to FIGS. 2-8. For example, a handle of a respective control input device can be gripped in each hand of the user. When using user control system 102, user 112 can sit in a chair in front of the user control system 102, position the user's head/eyes in front of the display device, and grip the control input devices, one in each hand, while resting forearms on an ergonomic support 110. In some user control systems, the user can stand while operating the control system.

These control input devices are positioned in a workspace 114 disposed inwardly beyond support 110. The control input devices can be moved in one or more degrees of freedom within workspace 114. In this example, workspace 114 is defined at the top by a housing 118 of the display device 106, at the back by a vertical support (not shown), and at the left and right sides by walls 116. Such physical barriers prevent physical interference from external objects (objects originating external to the user control system) or other persons entering the workspace from the top or sides. The front of the workspace 114 can be further defined with reference to ergonomic support 110, which can provide another barrier to interference from the front of the workspace 114 where the user reaches into the workspace.

User control system 102 can include an object sensing system including one or more object sensors of the present disclosure, which can sense objects within a sensed region of the sensors. The sensed region can include at least part of workspace 114, and/or regions external to workspace 114 and external to a physical boundary (e.g., a housing 108 and other components) of user control system 102. The object sensing system can determine if sensed objects may collide with the user object system, e.g., collide with control input devices and/or other components of user control system 102. One example of an object sensor includes sensors 105, which are positioned on a vertical support 117 of user control system 102 near foot controls 119 and have sensing fields directed upward to cover workspace 114. In other examples, object sensors can be positioned in any of various locations on a housing 108, e.g., at other locations to direct sensing fields into workspace 114 such as on the insides of walls 116, on support 110, etc. Housing 108 can include one of more of outside walls 116, a vertical support 117, housing 118 of display device 106, etc. Some other example positions of object sensors are described below with reference to FIGS. 2-4 and 7, which can be used in user control system 102.

Some implementations of user control system 102 can include one or more other types of control input devices. In this example, foot controls 119 can be control input devices that are positioned below the hand control input devices in workspace 114. In some examples, foot controls 119 can be contacted, depressed, slid, and/or otherwise manipulated by a user's feet to input various commands to the teleoperated system while the user is sitting at the user control system 102. In some examples, a foot control such as foot control 119 that can be manipulated (e.g., moved or activated by, e.g., sensing the user's foot) via contact with a foot can have a workspace that is a spatial region above the foot control in which a foot and/or leg is placed to activate the foot control. In some implementations, one or more foot controls 119 can be moved in one or more degrees of freedom, e.g., a foot pedal can be translated forward, back, left, and/or right, up and/or down, etc., and such a foot control can have a workspace defined by its degrees of freedom similarly to hand control input devices described herein. Foot control input devices can be affected by collisions of objects with the user control system similarly as other control input devices described herein. For example, unintentional manipulation of a foot control 119, by the user 112, by vibration of the user control system 102, or by an object itself, can occur from such collisions.

Other types of control input devices can also or alternatively be included in user control system 102 (and any of the user control systems herein). For example, buttons, dials, joysticks, capacitive or resistive sensing pads, sliders, mice, trackballs, and other types of controls can be located on the frame, display, or other component of user control system 102 within reach of and manipulated by a user's hands. Such control input devices can include workspaces similarly as described above and can be affected by collisions of objects with the user control system 102 as other control input devices described herein. For example, unintentional manipulation of a button or dial, by the user 112, by vibration of the user control system, or by an object itself, can occur from such collisions.

A manipulator system 104 is also included in the teleoperated system 100. For example, manipulator system 104 can be a manipulator slave device, or can alternatively be a different type of slave device or other controlled device. In some implementations as shown, during a surgical procedure, the manipulator system 104 can be positioned close to a surgical site located with reference to a patient or model disposed on an operating table 130 (or other type of work site), and manipulator system 104 can remain stationary until a particular procedure or stage of a procedure is completed. Other manipulator systems may move relative to a work site.

Manipulator system 104 can include one or more manipulator devices that can include arm assemblies 120. In some examples, an arm assembly 120 can include multiple links rotatably coupled to each other. Portions of the arm assembly can be actuated with a motor and sensed about rotational axes. In some examples, one or more of the arm assemblies 120 can be configured to hold a manipulator device such as an image capturing device, e.g., an endoscope 122, which can provide captured images of a portion of the surgical site. In some implementations, the captured images can be transmitted to the display device 106 of the user control system 102 and/or transmitted to one or more other displays, e.g., a display 124 coupled to the manipulator system 104.

In some examples, each of the other arm assemblies 120 may include a manipulator device such as a surgical tool 126. Each surgical tool 126 can include a surgical end effector, e.g., for treating tissue of the patient. An end effector can be provided the degrees of freedom provided by, e.g., the rotation of link members of the associated arm assembly, linear motion by an end effector mechanism, etc. Components in the arm assembly can function as force transmission mechanisms to receive teleoperated servo actuation forces and redirect the received forces to operate components of the end effector. An end effector can include one or more motors or other actuators that operate associated features of the end effector, such as the pitch, yaw, and/or roll movement of the end effector, opening jaws or moving a blade of the end effector, the output of material transported through a connecting tube (e.g., liquid or other fluids), suction forces, and/or any of a multiple of other end effector output functions. End effector mechanisms can include flexible elements, articulated "snake" arms, steerable guide tubes, catheters, scalpel or cutting blade, electro-surgical elements (e.g., monopolar or bipolar electrical instruments), harmonic cutter, scissors, forceps, retractors, dilators, clamps, cauterizing tools, needles, needle drivers, staplers, drills, probes, scopes, light sources, guides, measurement devices, vessel sealers, laparoscopic tools, or other tip, mechanism or device. One example of a surgical manipulator arm is a da Vinci® surgical system instrument manipulator arm in surgical systems commercialized by Intuitive Surgical, Inc. of Sunnyvale, California.

In this example, the arm assemblies 120 can be caused to move and articulate the surgical tools 126 in response to manipulation of corresponding control input devices at the user control system 102 by the user 112. This arrangement allows user 112 to, for example, direct surgical procedures at internal surgical sites through minimally invasive surgical apertures. For example, one or more actuators coupled to the arm assemblies 120 can output force to cause links or other portions of the arm assemblies to move in particular degrees of freedom in response to control signals received from the user control system 102. For example, movement of an arm and end effector in one or more degrees of freedom can correspond to movement in one or more degrees of freedom of an associated control input device handle by a user. The user control system 102 can be used within a physical environment (e.g., an operating room) with the manipulator system 104 (and other equipment, e.g., display cart), or can be positioned more remotely from the manipulator system 104, e.g., at a different location than the manipulator system.

In some implementations, each control input device can control functions of a manipulator device such as an associated arm assembly 120 of the manipulator system 104. For example, movement of a control input device in space activates one or more functions of a manipulator device in communication with the user control system. The controlled functions of the manipulator device can include movement of the manipulator device. In some examples, the control input devices are provided with the same degrees of freedom as the instruments of the manipulator system 104 to provide the user with telepresence, e.g., the perception that the control input devices are integral with the instruments so that the operator has a strong sense of directly moving instruments as if present at the work site.

Some implementations of the teleoperated system 100 can provide different modes of operation. In some examples, in a non-controlling mode (e.g., safe mode) of the teleoperated system 100, the controlled motion and/or other functions of the manipulator system 104 is disconnected from the control input devices of the user control system 102 in disconnected configuration, such that movement and/or other manipulation of the control input devices does not cause motion of the manipulator system 104. In a controlling mode of the teleoperated system (e.g., following mode, in which one or more manipulator devices follow a corresponding control input device), motion or activation of other functions of the manipulator system 104 can be controlled by the control input devices of the user control system 102 such that movement and/or other manipulation of the control input devices causes motion or activation of other functions of the manipulator system 104, e.g., during a surgical procedure. In some examples, in a controlling mode, one or more hand control input devices can be moved and/or activated to cause corresponding motion of a corresponding manipulator device. In further examples, one or more foot controls 119 can use a controlling mode and a non-controlling mode similarly as described for hand control input devices. For example, a foot control can be activated by a user 112 to provide commands to one or more manipulator devices of manipulator system 104 in a controlling mode. In some examples, movement of a foot control in a degree of freedom can cause corresponding movement of a manipulator device. In further examples, a foot control can be manipulated (e.g., moved or activated via foot presence) to provide commands such as output of irrigation of a fluid from a manipulator device, output of energy from a manipulator device, capture of images by an image capture device at a manipulator device, etc. Other types of control input devices of the user control system 102 can similarly be used with controlling mode and/or non-controlling mode.

Some implementations can be or include a teleoperated medical system such as a da Vinci® Surgical System (e.g., a Model IS3000 or IS4000, marketed as the da Vinci Si® or da Vinci Xi® Surgical System), commercialized by Intuitive Surgical, Inc. of Sunnyvale, California. However, features disclosed herein may be implemented in various ways, including in implementations at least partially computer-controlled, controlled via electronic control signals, manually controlled via direct physical manipulation, etc. Implementations on da Vinci® Surgical Systems are merely exemplary and are not to be considered as limiting the scope of the features disclosed herein. For example, different types of teleoperated systems having slave devices at work sites can make use of actuated controlled features described herein. Other, non-teleoperated systems can also use one or more described features, e.g., various types of control systems and devices, peripherals, etc.

For example, in various implementations, other types of computer-assisted teleoperated systems can be used with one or more features described herein, in addition to surgical systems. Such teleoperated systems can include controlled manipulator or slave devices of various forms. For example, submersibles, hazardous material or device disposal units, industrial applications, applications in hostile environments and worksites (e.g., due to weather, temperature, pressure, radiation, or other conditions), general robotics applications, and/or remote-control applications (e.g., remote controlled vehicle or device with a first-person view), may utilize teleoperated systems that include slave devices for sensory transmission (conveyed visual, auditory, etc. experience), manipulation of work pieces or other physical tasks, etc., and may use mechanically grounded and/or ungrounded control input devices to remotely control the slave devices. Any such teleoperated systems can be used with the various features described herein.

In some implementations, a controlled manipulator device can be a virtual representation of device, e.g., presented in a graphical simulation provided by a computing device coupled to the teleoperated system 100. For example, a user can manipulate the control input devices of the user control system 102 to control a displayed representation of an end effector in virtual space of the simulation, similarly as if the end effector were a physical object coupled to a physical manipulator device.

Figure 2:
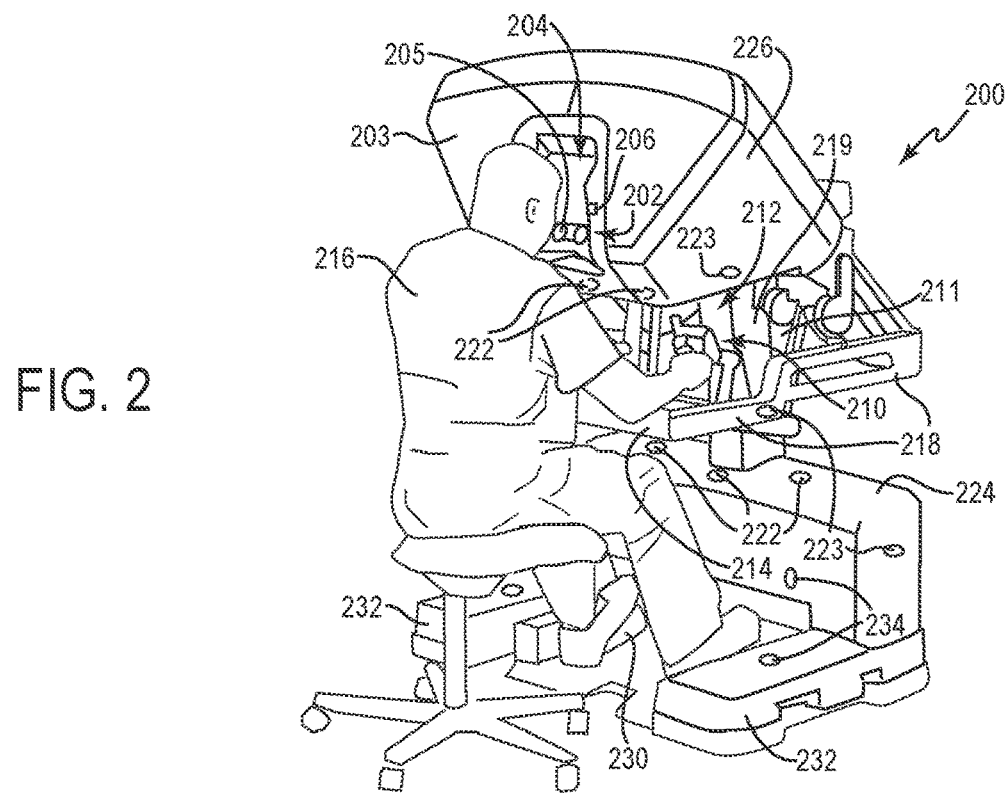
FIG. 2 is a perspective view of another example of a user control system which can include one or more features described herein, according to some implementations.

FIG. 2 is a perspective view of another example user control system 200, according to some implementations. User control system 200 can be similar to user control system 102 described above for FIG. 1.

User control system 200 includes a display device 202 in a display unit 203, by which digital images depicting a work site can be displayed during a procedure using the user control system 200 and other components of a teleoperated system, e.g., manipulator system 104. In some implementations, the display device 202 can include two viewports 205, such that the display device is provided behind or included in the viewports, or can provide one or more display screens or other display devices in place of viewports 205. The display unit 203 can also display other information instead of or in addition to views of a work site, such as a graphical user interface allowing selection of commands and functions, status information, alerts and warnings, notifications, etc. Such information can be displayed in combination with (e.g., overlaid on) a view of a work site, or without a work site view.

Display unit 203 can include a viewing recess 204 in which the display device 202 is positioned. When using the user control system 200, a user 216 can position the user's head within the recess 204 such that the user's eyes are positioned in front of the display device 202 to view images displayed by display device 202.

In some implementations, one or more user presence sensors 206 can be positioned at one or more locations of the user control system 200 to detect the presence of a user located next to or near to the user control system 200. In this example, user presence sensor 206 can sense a presence of a user's head within the recess 204. For example, an electromagnetic sensor (e.g., optical sensor) can be used for a presence sensor. For example, the optical sensor can include an emitter and a detector. A beam of infrared or other wavelength of light is emitted from one side of a recess associated with user presence sensor 206 by the emitter, and the beam is detected on the other side of the recess by the detector. If the beam is interrupted from detection by the detector, e.g., due to the user's head blocking the beam, then the system determines that a user's head is within the recess and that the user is in a proper position to use the control input devices of the user control system 200. Additional or alternative types of presence sensors can be used in various implementations, e.g., other object sensors as described herein can be used for user presence detection.

One or more hand control input devices 210 are provided for user manipulation. In some implementations, each control input device 210 can be configured to control functions of an associated manipulator device of the manipulator system 104. For example, a control input device 210 can be moved in a plurality of degrees of freedom to move a corresponding end effector of the manipulator system 104 in corresponding degrees of freedom. In some implementations, the control input devices are manual input devices which can be moved in all six Cartesian degrees of freedom. In some implementations, control input devices 210 can be rotatably coupled to a respective end of a respective mechanical arm 211 that includes two or more links in a mechanical linkage, as described in greater detail with respect to FIGS. 3 and 4.

The control input devices 210 are moveable in a workspace 212 of the control input devices 210 that is defined inwardly beyond a support 214. In some examples, support 214 is a horizontal beam that extends parallel to the front side of user control system 200 and is located in front of control input devices 210, e.g., closer to user 216 than control input devices 210. User 216 can rest forearms on support 214 while gripping the control input devices 210. For example, if two control input devices are provided, one control input device can be gripped in each hand. The user also positions his or her head within the viewing recess 204 to view the display device 202 while manipulating the control input devices 210. Various examples of portions of devices that can be used as control input devices 210 are described below.

In some implementations, workspace 212 can be partially surrounded by guard rails 218. In some examples, a respective guard rail 218 can be positioned on the left and right sides of the user control system 200, and each guard rail 218 extends approximately horizontally from the front to the rear of the user control system 200. In the example shown, each guard rail 218 is connected to the support 214 at the front of the user control system 200 and is connected to a vertical support 219.

In some implementations, workspace 212 can be defined as a space between support 214, guard rails 218, and a back vertical plane of user control system 200. The back vertical plane, for example, can be a back side of user control system 200 or a plane defined by a vertical support 219 of display device 202 at the back of the workspace 212. In some implementations, workspace 212 as defined by support 214 and guard rails 218 can be a smaller space than the full physical workspace that can be reached by the control input devices 210.

Display unit 203 and control input devices 210 can be supported by a frame that includes lower support base 224 and vertical support 219. Guard rails 218 and support 214 can also be coupled to and supported by the frame.

One or more foot control input devices 230 can be positioned below the hand control input devices 210 and manipulable by the user 216, in some implementations of user control system 200. For example, such foot controls can be similar to foot controls 119 of FIG. 1, e.g., can include pedals, buttons, sleds, or other elements. In some implementations, foot barriers 232 can be placed surrounding one or more sides of foot control input devices 230 to protect the foot control input devices 230 from interference from external objects, similarly to guard rails 218 for hand control input devices 210. For example, another person, cart, or other object may move to a location indicating it may collide with the leg of user 216 that is manipulating a foot control input device 230. In some implementations, the workspace of foot control input device 230 can be a region defined by the inner side surfaces of foot barriers 232. In other implementations, foot barriers 232 can be omitted from user control system 200, allowing a more compact user control system 200 with a smaller footprint, and the object detection features described herein can be used to determine whether foot control input device 230 should be disabled (e.g., removed from controlling mode), e.g., if collision with an unidentified object is detected as described in various implementations herein. Other types of control input devices and also or alternatively be included in user control system 200 similarly as described above.

User control system 200 can include an object sensing system that includes one or more object sensors of the present disclosure. Each object sensor can sense the presence of objects within a sensing field in space. In some implementations, a sensing field can include multiple individual sensing fields. In some examples, each individual sensing field can be provided by a corresponding one of multiple object sensors. In some examples, a sensing field can cover at least part of workspace 212 and/or one or more regions of space outside workspace 212, e.g., external to the components of user control system 200.

A variety of different types of objects can be sensed by the object sensors. Both moving and static objects can be sensed. For example, a hand may be moving when entering a sensed field, and may be static if rested on a surface. Other objects such as cell phones, cups, portable medical equipment, or various devices can be moved by a person into the sensed fields and/or can be static if placed down within the sensing field. Objects can include persons that walk by the user control system, and/or carts, equipment, or other large objects rolled or moved near the user control system.

One example of object sensors includes workspace sensors 222. In some examples, workspace sensors 222 can be located on a lower support base 224 of the user control system 200 below the workspace 212 of the control input devices 210. In further examples, workspace sensors 222 can be also or alternatively located above workspace 212, e.g., on a bottom surface of housing 226 of display unit 203. Workspace sensors 222 can sense the movement and/or position of identified and unidentified objects in a sensing field that covers workspace 212, such as control input devices 210 and/or other moveable components of user control system (e.g., moveable display units). In response to detecting an object, the object sensor generates one or more signals that are sent to a control unit of the user control system 200 (e.g., as described for FIG. 10). For example, in some implementations the signal can include one or more parameters, e.g., one or more values that indicate the detection of an object, a location of the object with reference to a component of user control system 200, a variable distance between the object and the object sensor (or other reference location), a velocity of the object, a trajectory of the object, and/or other characteristics of the object.

The object sensing system can also or alternatively include object sensors positioned at other locations of user control system 200. For example, object sensors 234 can be located on foot barriers 232 and/or lower support base 224 and can sense the movement and/or position of identified and unidentified objects in a sensing field that covers a workspace of foot control input devices 230, e.g., a region of space horizontally between foot barriers 232 and vertically between the floor and guard rails 218. Object sensors can similarly be located to provide sensing fields that cover the workspaces of other control input devices of user control system 200, e.g., buttons, dials, etc.

Some object sensors can be external sensors 223 that can sense objects located external to workspace 212 and external to the components of user control system 200. For example, a sensing field of an external sensor 223 can cover a region at least partially external to workspace 212, guard rails 218, housing 226 of display unit 203, and lower support base 224, and the region does not include the user 216. Such external sensors can be located at any of various locations of the user control system 200, such as at one or more sides of housing 226 of display unit 203 as shown, sides of guard rails 218 and/or support 214 as shown, one or more sides of lower support base 224 as shown, foot controls, a back side of vertical support 219, etc. Some other example locations of external sensors are described below with reference to FIGS. 3, 4, and 7, which can be used in user control system 200. In some implementations, one or more workspace sensors can also operate as external sensors, e.g., have sensing fields that cover both workspace regions and regions external to the user control system 200.

In some implementations, external sensors can be mounted on supports that are separate from user control system 200, e.g., on walls, ceiling, carts, or other structures in the physical environment of user control system 200.

The object sensors 222 and 223 can be any of a variety of types of sensors. Some examples that can be used for user control system 200 are described below with respect to user control system 300 of FIG. 3. Any of the object sensors of FIG. 2 can be used in the other implementations of user control systems described herein.

Some implementations of user control system 200 (and other user control systems described herein) can include one or more mechanically ungrounded control input devices that are free to move in space and are disconnected from ground. As used herein, a mechanically ungrounded control input device refers to a control input device that is unconstrained with respect to position and orientation motion in a workspace, and which is kinematically separated from the ground, e.g., not mechanically supported by the user control system (e.g., supports or other object contacting the ground). Location and motion of an ungrounded control input device can be sensed in its workspace using sensors included in the control input device and/or sensors positioned external to the control input device. A mechanically ungrounded control device may be in tethered or untethered connection with one or more associated components such as control processors, data sources, sensors, power supplies, etc.

In some examples of mechanically ungrounded control input devices, the user control system can include a display unit, similar to display unit 203 or other display units described herein, through which the user views images while grasping ungrounded control input devices and moving them freely in a workspace around the user. Such implementations can include an object sensing system similar to those described herein for systems having mechanically grounded control input systems. For example, object sensors can be positioned on the display unit and frame that holds the display unit, e.g., on the sides and bottom surface of the housing of the display unit, on the front and/or sides of a vertical support and base support, etc.

Figure 3:
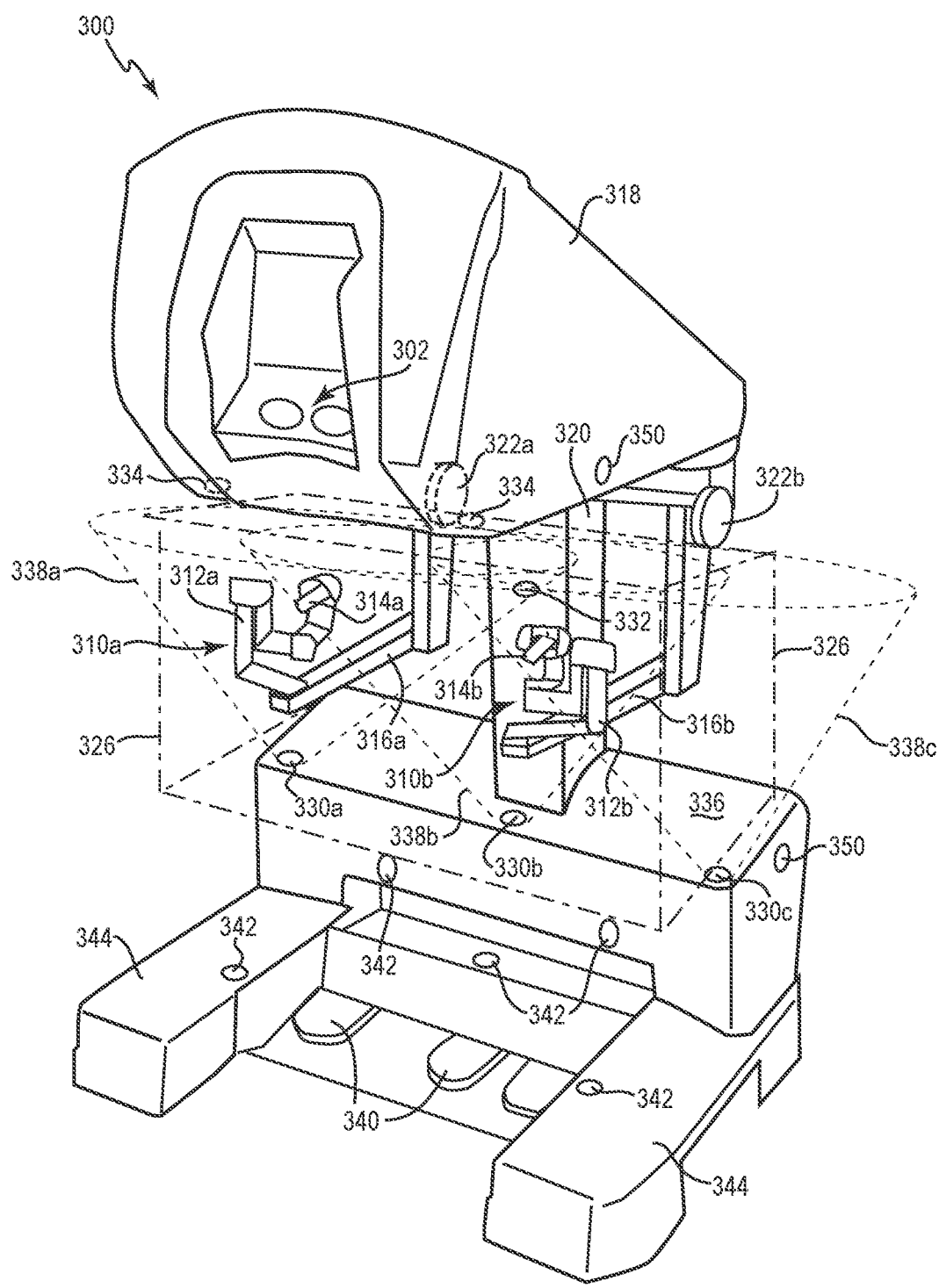
FIG. 3 is a perspective view of another example of a user control system which can include one or more features described herein, according to some implementations.

FIG. 3 is a perspective view of another example of a user control system 300, according to some implementations. Components of user control system 300 can be similar to that of user control systems 102 of FIG. 1 and 200 of FIG. 2, except where noted. User control system 300 can include a display device 302 positioned within a viewing recess 304, similarly as shown in FIG. 2.

One or more control input devices 310 are provided for user manipulation, including control input device 310a for the user's left hand and control input device 310b for the user's right hand. In some implementations, the control input devices are manual input devices which can be moved in all six Cartesian degrees of freedom. Control input devices 310 can include mechanical linkages to provide degrees of freedom to a handle of the control input device that is grasped by the user. For example, a gimbal mechanism 312a or 312b can be connected to handle 314a or 314b of control input devices 310a or 310b to provide multiple degrees of freedom to the handle.

In some implementations, as shown, control input devices 310a and 310b can be rotatably coupled to a respective end of a respective mechanical arm 316a and 316b that includes two or more links in a mechanical linkage. Mechanical arm 316a can be coupled to a frame of user control system 300, and the frame includes vertical support 320 and base support 336 and supports display unit 318 that houses display device 302. Mechanical arm 316a can include rotary couplings between the links to allow additional degrees of freedom to control input device 310a. Device sensors can be coupled to mechanical arm 316 to sense rotation of links, such as optical encoders or other types of sensors. In some implementations, one or more actuators 322a are coupled to mechanical arm 316a to output forces on links of the mechanical arm 316a. For example, such actuators 322a can include active actuators (e.g., motors) that generate forces on the mechanical arm, passive actuators (e.g., brakes) that provide frictional forces on the mechanical arm. The mechanical arm 316a and/or control input device 310a can also include mechanical force transmission systems to transmit actuator forces, e.g., gearing mechanisms such as gears, capstan mechanisms, etc. Mechanical arm 316b can include actuator 322b and other similar features to mechanical arm 316a. Counterbalancing mechanisms (e.g., including springs) can be used in some implementations to provide forces on control input devices that oppose gravity, without having to use active forces from the actuators for the counterbalancing. In some implementations, mechanical arms 316a and/or 316b can be used without actuators or active forces applied, e.g., can be used only with counterbalancing forces from a counterbalance mechanism. Some examples of devices that can be used as control input devices 310 are described below.

In some implementations, each control input device 310 can be configured to control functions of a manipulator device, e.g., of the manipulator system 104. For example, a control input device 310 can be moved in a plurality of degrees of freedom to move a corresponding end effector of the manipulator system 104 in corresponding degrees of freedom. For example, a user can grip a control input devices 310a or 310b in each hand.

The control input devices 310 are positioned and moveable in a workspace 326. In some implementations, workspace 326 can indicate the range of motion of the handles 314. This example of user control system 300 is shown having a workspace 326 that does not have physical barriers such as walls (e.g., walls 116 of FIG. 1), guard rails (e.g., guard rails 218 of FIG. 2), and ergonomic supports (e.g., support 214 of FIG. 2) that physically protect workspace 326. Protection from collision can be provided instead from features of the present disclosure, including object sensors and force boundaries created around a user control device or workspace, as described below. Removal of the physical barriers can allow the control input devices 310 to have a greater range of motion without being constrained by such barriers. Removal of the barriers can allow user control system 300 to be reduced in size without reducing the size of the workspace 326, allowing for a more compact user control system 300. In some implementations, removal of an ergonomic support such as support 214 of FIG. 2 can allow the user to sit closer to the workspace 326 and control input devices 310. In some implementations, armrests can be provided in a different location for user convenience, e.g., on a chair in which the user sits while operating user control system 300.

An object sensing system including one or more object sensors is included in user control system 300, similarly as described above. The object sensors can detect objects in their sensing fields. Some object sensors can perform processing on detection signals and provide processed signals to a control unit coupled to the user control system (e.g., a control circuit that may include a processor, as in FIG. 10). In some implementations, the object sensing system can detect the positions of an object over time and determine a direction of the object relative to a reference location, and/or determine a velocity of the object, and send parameters or values describing the detection, the direction, and/or the velocity to the control unit.

Similarly as described above for FIG. 2, the object sensors can include one or more workspace sensors 330, 332, and/or 334. Workspace sensors 330, 332, and/or 334 have a sensing range that covers at least part of workspace 326. In some examples, workspace sensors 330, 332, and 334 can sense the locations and/or movement of identified objects such as control input devices 310 and/or other moveable components of user control system (e.g., moveable display units), and can sense the intrusion of unidentified objects in workspace 326. In this example, workspace sensors 330 are located on base support 336 and can be directed upward toward workspace 326. Workspace sensor 332 is located on vertical support 320 and can be directed sideways toward workspace 326. Workspace sensors 334 are located on a bottom surface of display unit 318 and can be directed down toward workspace 326. Any one or more of these workspace sensors 330, 332, 334 may be used in various implementations, and/or workspace sensors in other locations of the user control system may be used.

In one example, sensing fields of three workspace sensors 330 are shown in FIG. 3, and sensor 330a has a sensing field 338a, sensor 330b has a sensing field 338b, and sensor 330c has a sensing field 338c (collectively referred to as sensing fields 338). Each sensing field 338 senses a different region that includes a portion of the workspace 326 of the control input devices 310. The sensing fields 338a, 338b, and 338c can be combined to cover a region covering the entire workspace 326. For example, inputs from the sensors providing sensing fields 338a, 338b, and 338c can be input to the control unit, which can combine the signals to obtain a single sensed region. The sensing fields 338a, 338b, and 338c can overlap with one or more other sensing fields 338 of other sensors. In some implementations, such overlap allows two or more workspace sensors 330 to detect objects in particular regions in the workspace, thus providing redundancy for more robust object detection. In other implementations, a single workspace sensor 330 can be used, e.g., having a sensing field that covers the entire workspace 326. In some implementations, one or more other workspace sensors (e.g., sensors 332, 334, etc.) can also be used and their sensing fields combined with the sensing fields of workspace sensors 330 for more robust object detection.

In some implementations, user control system 300 includes foot input devices 340 that can be manipulated by a user similarly to foot controls 119 and foot control input devices 230 described above. For example, object sensors 342 can be located on foot barriers 344 and/or base support 336, directing their sensing fields to a workspace of the foot input controls 340, e.g., defined by foot barriers 344, the floor, a height below control input devices 310 (e.g., overlapping with workspace 326 in some implementations). Object sensors 342 can detect objects in their sensing fields similarly to workspace sensors 330. Other types of control input devices can also or alternatively be included in user control system 300, and object sensor(s) can be used to provide sensing fields covering workspaces of such devices similarly as described above.

User control system 300 can also or alternatively include object sensors that are external sensors 350 similarly as for user control system 300. For example, external sensors 350 can be located on either side of the user control system 300, e.g., on base support 336, on the housing of display unit 318, on the back of the user control system 300 (as for any of the implementations described herein), near foot controls, etc. Some additional examples of external sensors and sensing fields for external sensors are described below with reference to FIGS. 4 and 7. In some implementations, one or more workspace sensors can also operate as external sensors, e.g., have sensing fields that cover both workspace regions and regions external to the workspace and external to user control system 300.

The object sensors (e.g., workspace sensors 330, 332, and 334 and/or external sensors 350) can be any of a variety of types of sensors to provide object detection in the sensing fields that cover regions of space that can include at least part of the workspace 326 and/or at least part of one or more regions external to the user control system.

In some implementations, the object sensors can provide a vision-based tracking system that provides three-dimensional (3-D) data and tracking of an object in a region of space. Various types of image capture devices can be used as object sensors to capture digital images of scenes in the sensing fields of the devices. For example, the object sensors can include stereoscopic image capture devices and/or structured-light image capture devices.

In some examples, stereoscopic image capture systems and/or structured-light image capture systems can use multiple image capture devices (e.g., cameras) to capture scenes of a sensed region and create a 3-D representation of the region. An object can be detected in the 3-D representation and its location determined. A velocity and trajectory of the object can be determined over multiple images of the region captured and stored over time. In some implementations, a 3-D representation is not created and an object is detected in two-dimensional (2-D) captured images of a region. For example, the location of an object within the sensed field can be determined with respect to an image border or to other known objects depicted in the image (e.g., components of the user control system).

In some implementations, object recognition techniques can be used to determine recognized types of objects from pixels of images captured by image capture devices. For example, machine learning techniques, e.g., machine learning algorithms trained with images of particular types of objects, can be used to recognize those object types in images. In some examples, objects such as hands or other body parts, portable devices such as cell phones, pens and pencils, drinking cups, medical equipment, carts, or other types of objects can be recognized as detected objects in images. In some implementations, the system can be trained with similar techniques to recognize persons as objects, e.g., faces of persons as a general type of object, and/or faces of specific persons based on facial features (e.g., eyes, nose, mouth, etc.). In some examples, the faces of one or more designated users of the user control system can be stored as recognized patterns or are used to train the system to recognize these faces. If a designated user's face is detected in a sensing field, the face can be considered an identified object, and/or provide a lower alert level. A detected face that does not belong to designated user can be considered an unidentified object. In some implementations, if a person is identified as a designated user, that user's other body parts, e.g., arms, hands, and feet, are also considered identified objects. For example, the two arms, hands, legs, and feet of the identified designated user can be identified and tracked while the designated user operates the user control system. Other people in the vicinity of the user control system, including their body parts, are still considered unidentified objects.

In some implementations, Lidar (3-D laser scanning) sensors can be used, which include an emitter to illuminate a sensing field with laser light and a sensor to measure the reflection from objects in the field. Differences in laser return times and wavelengths can be used to make digital 3-D representations of the sensed field. Lidar can use a time-of-flight of light pulse echoes that are reflected from an object to measure distance to the object, and can use the time difference between pulses to measure velocity of the object.

In some implementations, electromagnetic sensors (e.g., optical sensors including infrared sensors, etc.) can be used, which are able to detect any of various ranges of wavelengths of electromagnetic radiation, including visible light, infrared light, etc. In some examples, an electromagnetic sensor includes an emitter that emits a electromagnetic signal in the sensing field, and a detector that detects the electromagnetic signal (or a portion thereof) reflected from an object in the sensing field. For example, an electromagnetic sensor can detect a magnitude of a reflected beam of electromagnetic radiation to determine a distance to the sensor of a surface which reflected the beam (e.g., the greater the magnitude, the smaller the distance to the object) and determine a location of the object in the sensing field based on the distance. In another example, optical time-of-flight sensors can detect an object by measuring a location of the object that is the distance between the sensor and the object in the sensing field of the sensor, based on a measured time difference between the emission of an electromagnetic signal and the return of the electromagnetic signal to the sensor after it has been reflected by the object. The system can determine the direction of movement of an object by determining the distance of sensed objects to multiple object sensors over time. In some implementations, an emitter can be located on one side of the workspace 326 and a detector is located on an opposite side of the workspace 326 which senses the presence or absence of a beam of electromagnetic energy emitted by the emitter due to objects blocking the beam or allowing the beam to pass.

In some implementations, ultrasonic sensors can be used as object sensors. An ultrasonic sensor emits an ultrasonic wave in the sensing field that is reflected from an object in the field. A sensor receives the reflected wave, and an object can be detected based on the distance from the sensor to the object that can be determined based on the time of travel of the wave. In some implementations, an ultrasonic sensor can detect magnitudes of reflected sonic pulses to indicate distance of the sensor element from the sensor. In some implementations, ultrasonic sensors may have larger, less well-defined sensing fields than other types of sensors.

In some implementations, one or more thermopile sensors can be used as object sensors. A thermopile sensor includes a detector that detects infrared radiation emitted by objects located in the sensing field of the sensor. The sensor detects thermal changes, e.g., a differential temperature change, from the presence of objects of different temperatures in its sensing field. Some objects such as persons or body portions (e.g., hands of persons) can be detected with such sensors, since infrared radiation emitted by body portions may be stronger (warmer) than other components that may be located in the sensing field.

In some implementations, thermal imaging cameras (e.g., thermographic cameras) can be used as object sensors. For example, a thermal imaging camera can sense infrared radiation from warmer temperatures located in the sensing field of the camera, and provide data based on the sensed radiation that can be processed into 2-D images. A thermal imaging camera can detect the presence of body portions such as a hand located in the sensing field of the thermal imaging camera. A thermal imaging camera can sense and store successive frames or captured images of the sensing field, allowing determination of the direction, velocity, and/or trajectory of sensed objects.

In some implementations, contact sensors can be used as object sensors, which can detect contact of objects such as hands (or other body portions) when physically contacting the sensor or a surface physically connected to the sensor. For example, capacitive or resistive sensors can be used, which measure the change in capacitance or resistance, respectively, when a hand contacts the sensor (or when the hand is very near to the sensor, e.g., for capacitive sensors). In some examples, contact sensors can be provided at locations where users may place hands, e.g., guard rails or ergonomic support (shown in FIG. 2). Such detections can further inform the control unit about objects such as hands that may also be detected by other object sensors of the user control system.

In various implementations, the sensors can sense energy reflected by an object in a sensing field (e.g., optical time of flight, reflected laser, or ultrasound sensors), sense energy radiated by an object in a sensor field (e.g., heat energy in the infrared spectrum), or sense other physical quantities (e.g., physical pressure, electrical capacitance change, etc.). The energy or other physical quantity can be detected directly (e.g., an imaging camera) or indirectly by an effect it causes (e.g., a thermopile sensor).

In some implementations, a signal generated by the object sensor includes a parameter. The parameter can include a value that corresponds to a variable distance between an object in the sensing field and the sensor. In another example, the parameter includes a value that corresponds to a direction of the object in the sensing field relative to the sensor or a velocity of the object in the sensing field. In another example, the value is provided to a control unit (e.g., processor) for use in determining characteristics of the object (e.g., whether it is an identified or unidentified object, location, velocity, trajectory, etc.).

One or more of the object sensors described herein can be implemented using an integrated circuit sensor that includes, for example, one or more of an emitter, a sensing element, signal conditioner, analog to digital converter (ADC), math engine to calculate sensed characteristics (e.g., sensed object temperature for a thermopile sensor), etc.

In some implementations, the locations of the object sensors on the user control system (e.g., where they are mounted on the user control system) are precisely known by the system with reference to the known mounting locations of components of the user control system. Such components include control input devices and/or moveable display units (e.g., see FIG. 4). The known mounting locations of the object sensors allows the use of kinematic information describing the physical dimensions, locations, and motion of these components (e.g., from sensor data provided by sensors in mechanical links, etc.) to be referenced accurately to the sensing fields of the object sensors and allows the object sensors to use the kinematic information to determine the locations of these components within their sensed fields. Any of the object sensors of FIG. 3 can be used in the other implementations of user control systems described herein.

Figure 4:
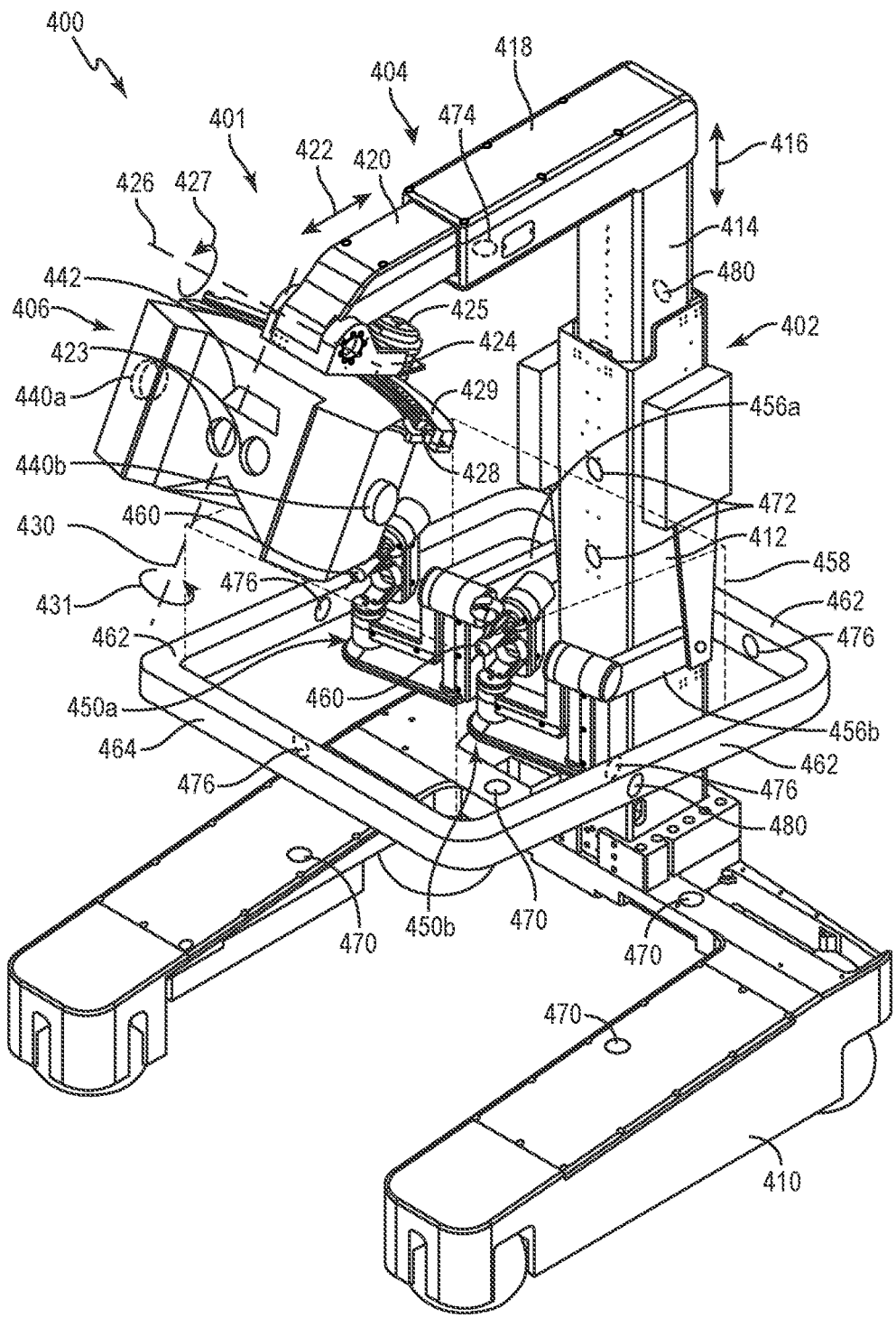
FIG. 4 is a perspective view of another example of a user control system, according to some implementations.

FIG. 4 is a perspective view of another example of a user control system 400, according to some implementations. User control system 400 can include a display system 401 that includes a moveable viewing unit that can adjust its position and/or orientation to adjust to user viewing angles and/or head position, and/or to provide input commands to a manipulator system (e.g., manipulator system 104).

Display system 401 includes a base support 402, an arm support 404, and a display unit 406. Display unit 406 is provided with multiple degrees of freedom of movement provided by a frame including base support 402, arm support 404 coupled to the base support 402, and a tilt member 424 coupled to the arm support 404, and the display unit 406 is coupled to the tilt member.

Base support 402, in this example, is a vertical member that is mechanically grounded, e.g., coupled to ground via a support structure 410 resting on the ground. Base support 402 can include a first base portion 412 and a second base portion 414 that is translatable with respect to the first base portion 412 in a linear degree of freedom 416, e.g., via a telescopic coupling. The linear translation of second base portion 414 can be sensed by one or more device sensors and driven by one or more actuators (e.g. motors) coupled to first base portion 412.

Arm support 404 is a horizontal member that is mechanically coupled to the base support 402. Arm support 404 can include a first arm portion 418 and a second arm portion 420 that is linearly translatable with respect to the first arm portion 418 in a linear degree of freedom 422, e.g., via a telescopic coupling. The linear translation of second arm portion 420 with respect to first arm portion 418 can be sensed by one or more device sensors and driven by one or more actuators, e.g., motors, coupled to first arm portion 418. In some examples as shown, arm support 404 extends along a horizontal axis that is orthogonal to a vertical axis along which base support 402 extends.

Display unit 406 is mechanically coupled to arm support 404. Display unit 406 is moveable in two linear degrees of freedom provided by the linear translation of the second base portion 414 and second arm portion 420. Display unit 406 includes a display device, e.g., one or more display screens, projectors, or other display devices, that can display digital images in viewports 423 or other components similarly as display units described in other implementations herein.

Display unit 406 is rotationally coupled to the arm support 404 by a tilt member 424 that is rotationally coupled to the second arm portion 420 by a rotary coupling, providing rotational motion of the tilt member 424 and display unit 406, in a rotary tilt degree of freedom about tilt axis 426 with respect to the second arm portion 420. In some implementations, tilt axis 426 is positioned above a position of a user's head when the user operates the display unit 406, or the tilt axis can be positioned closer to the user. The rotational motion of tilt member 424 and display unit 406 about tilt axis 426 can be sensed by one or more device sensors and driven by one or more actuators coupled to the tilt member, e.g., a motor that can be controlled by control signals from a control circuit (e.g., control system).

In some implementations, display unit 406 is rotationally coupled to the tilt member 424 and may rotate about a yaw axis 430 (e.g., the yaw axis can be a lateral rotation axis), e.g., lateral or left-right rotation from the point of view of an operating user. For example, display unit 406 is coupled to tilt member 424 by a rotary mechanism enabling rotation about yaw axis 430 in a yaw degree of freedom 431, e.g., a track mechanism including a curved track 428 that slidably engages a groove member coupled to tilt member 424. The yaw motion of display unit 406 about yaw axis 430 can be sensed by one or more device sensors and driven by one or more actuators coupled to the display unit, e.g., a motor/sensor 425. For example, motor/sensor 425 can output force via a drive mechanism that includes a capstan drum 429 coupled to a capstan pulley driven by motor/sensor 425.

Display system 401 thus provides display unit 406 with vertical linear degree of freedom 416, horizontal linear degree of freedom 422, rotational (tilt) degree of freedom 427, and rotational yaw degree of freedom 431. A combination of coordinated movement of components of display system 401 in these degrees of freedom (e.g., linear and rotational) allow display unit 406 to be positioned and at various positions and orientations in its workspace, e.g., translated and/or rotated around a user, to facilitate a custom viewing experience for the user.

In some implementations, display unit 406 can include input devices that allow a user to provide input to manipulate the orientation and/or position of the display unit 406 in space, and/or to manipulate other functions or components of the display system 401 and/or a larger system (e.g., teleoperated system). For example, hand input devices 440*a* and 440*b* (e.g., buttons, touchpads, force sensors, joysticks, knobs, etc.) can be provided on surfaces of display unit 406 and manipulated by a user's hands to provide control signals to the display system 401 to cause a change in orientation and/or position in space of display unit 406. A head input device 442 can include one or more sensors that sense user head input, e.g., from the user's forehead. Head input can be received as commands to controls actuators to cause the display unit 406 to be moved in particular degrees of freedom.

In some implementations, display unit 406 can additionally or alternatively be moved in one or more of its degrees of freedom in response to receiving user input from other input devices of display system 401 or of other connected systems. For example, control input devices 450, input devices coupled to base support 402 or an arm support, foot controls similar to foot controls 119 of FIG. 1 (which can be similarly used in user control system 400), and/or other types of input devices can be used to move the display unit 406 in particular degrees of freedom.

In some implementations, multiple display units similar to display unit 406 can be provided in user control system 400, each display unit moveable within its own workspace. For example, the user can use additional display units as auxiliary displays that display information related to operating tasks using the user control system.

User control system 400 also can include one or more control input devices 450 for user manipulation, including control input device 450a for the user's left hand and control input device 450b for the user's right hand. In some implementations, the control input devices are manual input devices which can be moved in six Cartesian degrees of freedom, similar to control input devices 310 of FIG. 3 and examples of which are described with reference to FIG. 8. In some implementations, control input devices 450a and 450b can be rotatably coupled to a respective end of a respective mechanical arm 456a or 456b that includes two or more links in a mechanical linkage. Mechanical arms 456a and 456b can be similar to mechanical arms 316a and 316b of FIG. 3, including using one or more sensors and actuators coupled to mechanical arms 456a and 456b to sense movement and output forces on links of the mechanical arms. In some implementations, each control input device 450 can be configured to control motion and functions a manipulator device such as a corresponding arm assembly 120 and/or end effector of the manipulator system 104, similarly as described for FIGS. 1-3. Foot control input devices and other types of control input devices (not shown) can also or alternatively be included in user control system 400, similarly as described for user control systems of FIGS. 1-3.

The control input devices 450 are positioned and moveable in a workspace 458, an example of which is indicated by dashed lines in FIG. 4. In some implementations, workspace 458 can be bordered by guard rails 462 on left and right sides, an arm support 464 in front, and first base portion 412 that can provide protection from collisions of control input devices 450 with various objects directed from sides, rear, and front of the user control system 400, similarly to the user control system 200. In this example, user control system 400 does not have walls (e.g., walls 116 of FIG. 1) that physically enclose and protect workspace 458. In some implementations that include guard rails 462 and/or arm support 464, workspace 458 can be defined based on the locations of guard rails 462 and/or arm support 464, such that control input devices 450 are not allowed to be positioned outside the defined workspace.

In some implementations of user control system 400 (or any user control system herein), the designated workspace indicates a maximum range of motion or physical reach of control input devices 450 (e.g., of control input device 460 or other component). In some implementations, the defined workspace indicates a maximum allowed range of motion of the control input devices, and movement of the control input devices outside the workspace may be physically possible but is not allowed. Some implementations can constrain the movement of control input devices to the defined workspace, e.g., using physical barriers or stops (e.g., guard rails, supports, etc.) and/or using forces output by actuators on control input devices 460 and/or mechanical arms 456 (and/or the forces can dampen, resist, or oppose movement outside the defined workspace).

Figure 7:
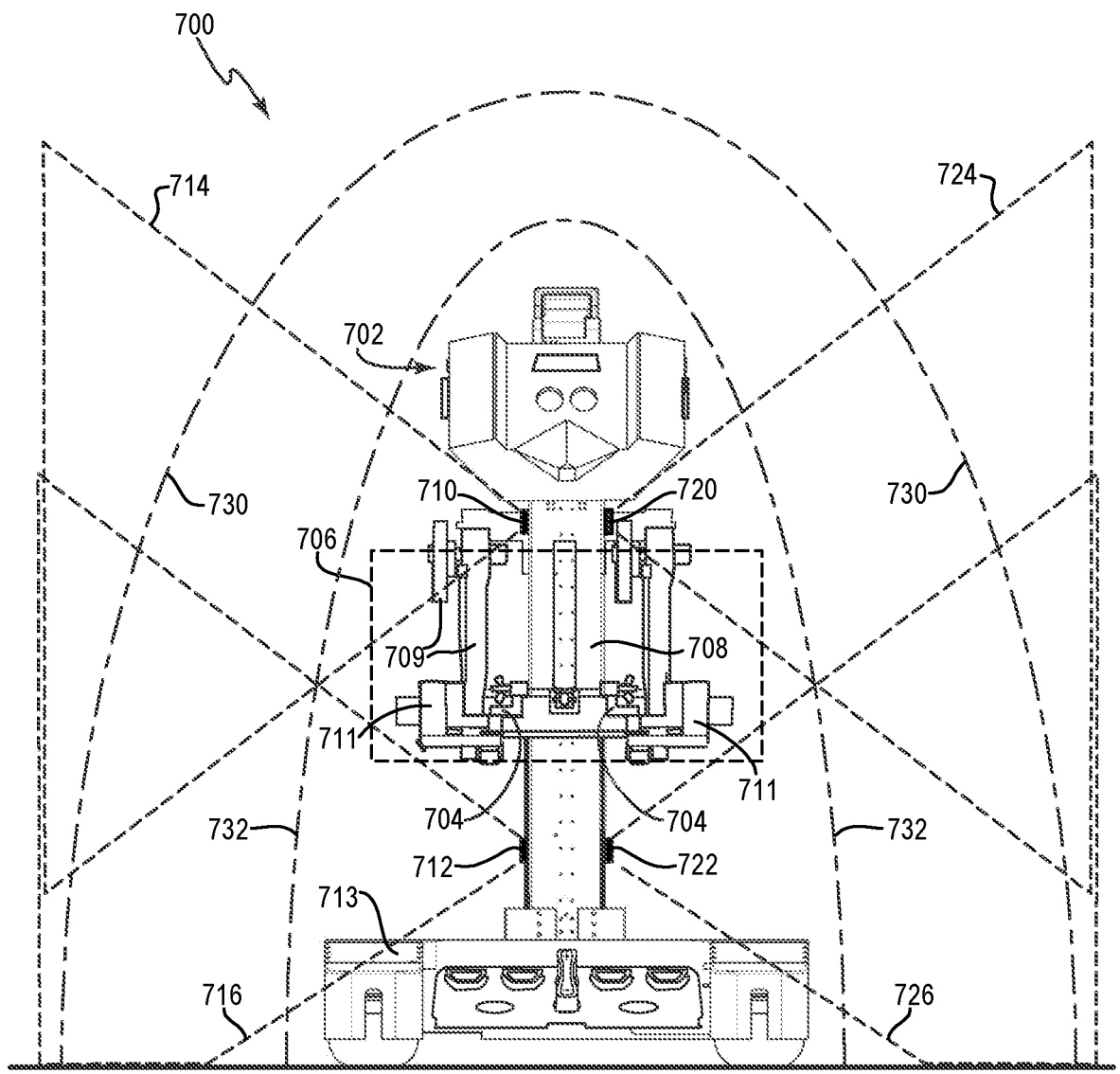
FIG. 7 is a front elevational view of an example user control system including object sensors and external threshold regions, according to some implementations.

In some implementations, guard rails 462 and/or arm support 464 are omitted from user control system 400, similarly to user control system 300 of FIG. 3, an example of which is shown with respect to FIG. 7. According to features described herein, protection from collision of various objects with control input devices 450 and/or with display unit 406 can be provided using object sensors and/or haptic spatial boundaries implemented around a user control device or workspace, as described below. In some of these implementations, workspace 458 can be made larger than a workspace defined by guard rails and/or arm support, if the control input devices 450 have a greater maximum range of motion than allowed by such rails and support.

Object sensors are included in user control system 400, similarly as described above for FIGS. 2 and 3. Similarly as described for FIGS. 2 and 3, the object sensors can be any of a variety of types of sensors to provide object detection in a sensing field. In some implementations, the object sensors can include workspace sensors 470, 472, 474, and/or 476. Workspace sensors 470-476 each have a sensing field that covers at least part of workspace 458. In some examples, workspace sensors 470-476 can sense the movement and/or position of identified objects such as control input devices 450 and/or moveable display unit 406, and can sense the intrusion of unidentified objects in workspace 458. In this example, workspace sensors 470 are located on support structure 410 and can have a sensing field generally oriented upwards into workspace 458. In some implementations, workspace sensors 470 can also or alternatively detect objects with reference to foot control input devices (not shown), similarly to the foot control input devices described with reference to FIGS. 1-3. Workspace sensors 472 are located on first base portion 412 and can have a sensing field generally oriented to the side into workspace 458. Workspace sensor 474 is located on a bottom surface of first arm portion 418 and can have a sensing field generally oriented down into workspace 458 (e.g., the sensing field of sensor 474 may change based on the height of arm support 404). Workspace sensors 476 are located on various portions of guard rails 462 and arm support 464. For example, sensors 476 can be located on the inside surfaces of guard rails 462 and/or arm support 464 and can have sensing fields generally oriented to the side and/or up/down into workspace 458, depending on the relative positions of the guard rails, support, and workspace. Object sensors can be located at other locations or at any similar or corresponding locations of the user control systems 102, 200, 300, and 700 described herein.

Sensing fields of workspace sensors 470-476 can cover regions that cover part of or the entire workspace 458. Examples of sensing fields are shown with respect to FIG. 3 and can be similarly implemented for user control system 400. Workspace sensors 470-476 can detect identified objects, such as the control input devices 450. Furthermore, the display unit 406 (and/or mechanisms or supports attached to the display unit) is an identified object that can be detected. These objects are identified due to their positions and orientations being known to the user control system, e.g., via sensor data from object sensors and/or via kinematic information describing their positions, dimensions, and shapes derived from sensor data from device sensors used to track those components.

The object sensors of user control system 400 can also include external sensors similar to other external sensors described herein, such as external sensors 480 and 482. In some cases, such sensors can be located on various components of user control system 400 to cause their sensing fields to be directed away from the user control system 400 toward adjacent regions external to and surrounding the user control system 400. For example, external sensor 480 is directed to a region that is adjacent to the right side of user control system 400. External sensor 482 is directed to a region that is adjacent to the rear side of user control system 400. External sensors can be directed to other regions adjacent to the user control system, e.g., left side, front side (e.g., covering a region to the rear of the user operating the user control system), etc. Some examples of external sensors and their sensing fields are described with reference to FIG. 7.

In some implementations, any of sensors 470-476 or 480-482 as shown in FIG. 4 (or other object sensors described herein) can represent a set or array of multiple sensors. For example, each sensor of the array of sensors can be oriented in a different direction such that a larger sensing region surrounding the sensor array is created. Any of the object sensors of FIG. 4 can be used in the other implementations of user control systems described herein.

Figure 5:
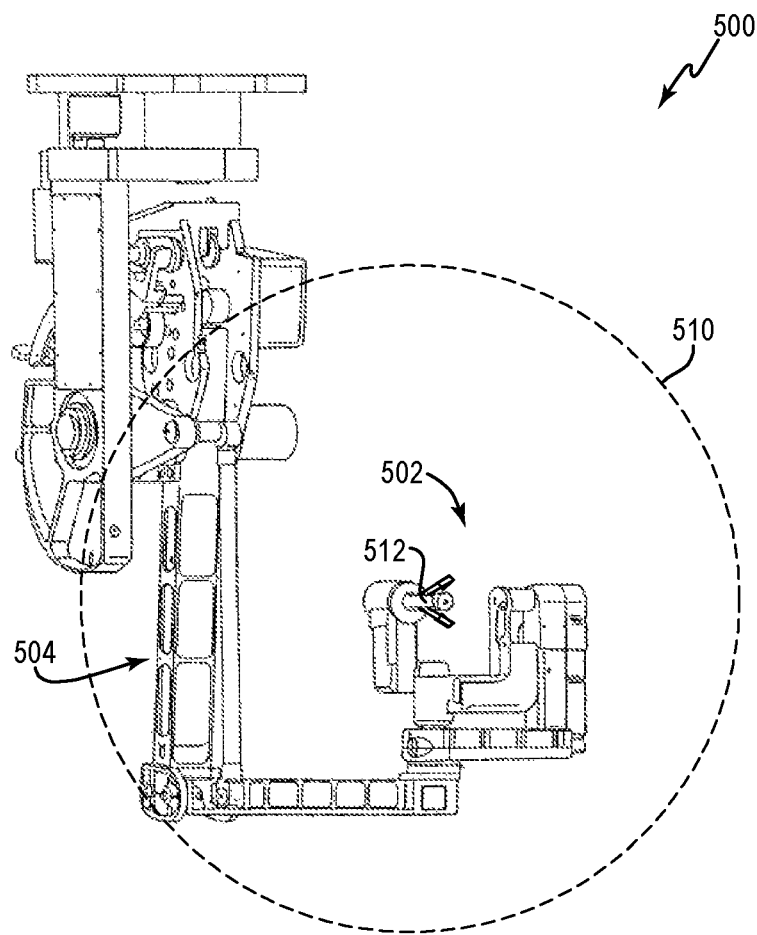
FIG. 5 is a perspective view of an example input mechanism with an example threshold region, according to some implementations.

FIG. 5 is a perspective view of an example input mechanism 500 with an example threshold region, according to some implementations. Input mechanism 500 includes a control input device 502 and a mechanical arm 504 which can be similar to any of various examples of these components described herein. Input mechanism 500 can be used in a user control system, e.g., a user control system 102, 200, 300, 400, or 700 having control input devices and mechanical arms as described herein. In some examples, control input device 502 can be similar to other control input devices described herein, e.g., controller portion 800 of FIG. 8 (described below), and can control motion of one or more manipulator devices of manipulator system 104.

Threshold region 510 represents a region in which an object can be detected by one or more object sensors of the user control system. In various implementations, threshold region 510 can be covered by sensing fields of one or more object sensors. Threshold region 510 can be, for example, sensed by workspace sensors, external sensors, or both external sensors and workspace sensors used in conjunction. In some implementations, threshold region 510 can be sensed using sensing fields of object sensors that can detect both workspace and external regions.

Threshold region 510 can surround control input device 502 and/or mechanical arm 504 in a particular configuration (e.g., size and shape). If an object is detected in threshold region 510, one or more functions of the user control system (e.g., teleoperated system 100) may be triggered and activated. In some examples, as described herein, the user control system can be in a controlling mode in which movement of the control input device 502 in space activates one or more functions of a manipulator device, such as causing corresponding movement of a corresponding end effector of manipulator system 104. If an unidentified object is detected in threshold region 510, the user control system exits from controlling mode and activates a non-following mode in which movement of the control input device 502 does not cause movement of the corresponding end effector. This is a safety function that anticipates potential collision of the object with the control input device 502, that could cause undesired motion of the control input device 502 and thus undesired motion of the manipulator end effector (which may be at work site such as a patient in a surgical procedure, etc.).

In some implementations, other functions of the user control system may be triggered by detection of an object in threshold region 510. For example, a warning or alarm can be output by the user control system, e.g., a visual message on a display, an audio alarm from speakers, a haptic effect output on control input device 502, etc. In some implementations, the triggered function can be forces that are output on mechanical arm 504 and/or control input device 502 by actuators controlled by the user control system, e.g., to provide safety features. Some examples of such forces are described below with respect to FIG. 6.

In the example of FIG. 5, threshold region 510 has a spherical shape, and its radius is based on a threshold distance from a reference location on control input device 502. In this example, threshold region 510 is centered on a location on handle 512 of control input device 502 (e.g., a center location of a central member of the handle). In other examples, threshold region 510 can be centered on other locations of control input device 502 or mechanical arm 504. In some implementations, threshold region 510 can be centered on a location that is in space at a predefined distance from the control input device 502 or mechanical arm 504. Other shapes of threshold regions can be used, e.g., rectangular, ellipsoid, cone-shaped, irregular shaped, etc. Multiple threshold regions similar to region 510 can be defined for respective multiple locations on the control input device 502 and/or mechanical arm 504.

In some implementations, threshold region 510 can be a near threshold region determined by a near threshold distance from the control input device, and other threshold regions can be defined at other threshold distances and used for triggering other functions of the user control system. For example, a warning threshold region can be designated at a greater threshold distance from the control input device than the near threshold region. If an unidentified object is detected in the warning threshold region, the user control system can output a warning similarly as described above.

In various implementations, the user control system can check for other characteristics of the detected object to inform the determination of whether to activate a function (e.g., exit controlling mode). For example, a trajectory of the object can be determined as described herein, and if the object is moving toward the control input device within a threshold range of trajectories, controlling mode can be exited. In another example, a velocity of the object can be determined as described herein, and if the velocity is above a particular velocity threshold, then controlling mode can be exited. Any combination of these characteristics can be detected and can be used to influence whether to activate the function(s) associated with detection of objects in threshold region 510.

In some implementations, one or more thresholds used to define region 510 and/or activate the associated function(s) of the user control system can be dynamic, e.g., can be adjusted based on currently-sensed conditions of the physical environment surrounding the control input device and/or user control system besides the detected object. For example, the thresholds used for distance, velocity, and/or trajectory can be adjusted based on environmental conditions such as a control task of the user control system requiring more complex motions of the control input device, a number of persons detected in the physical environment of the user control device, the frequency of persons moving in the physical environment (e.g., number of times that one or more persons walk by the user control system within a threshold range per time unit), the time of day (e.g., a time late in the workday may have user and persons more prone to mistakes), etc. Some of these conditions can be detected by object sensors, for example. These conditions may be considered to increase the likelihood of a collision with an object, so that the thresholds can be changed to make exiting controlling mode or outputting a warning easier to occur. For example, the threshold distance that triggers the exit from controlling mode can be larger than if such conditions are not detected.

Figure 6:
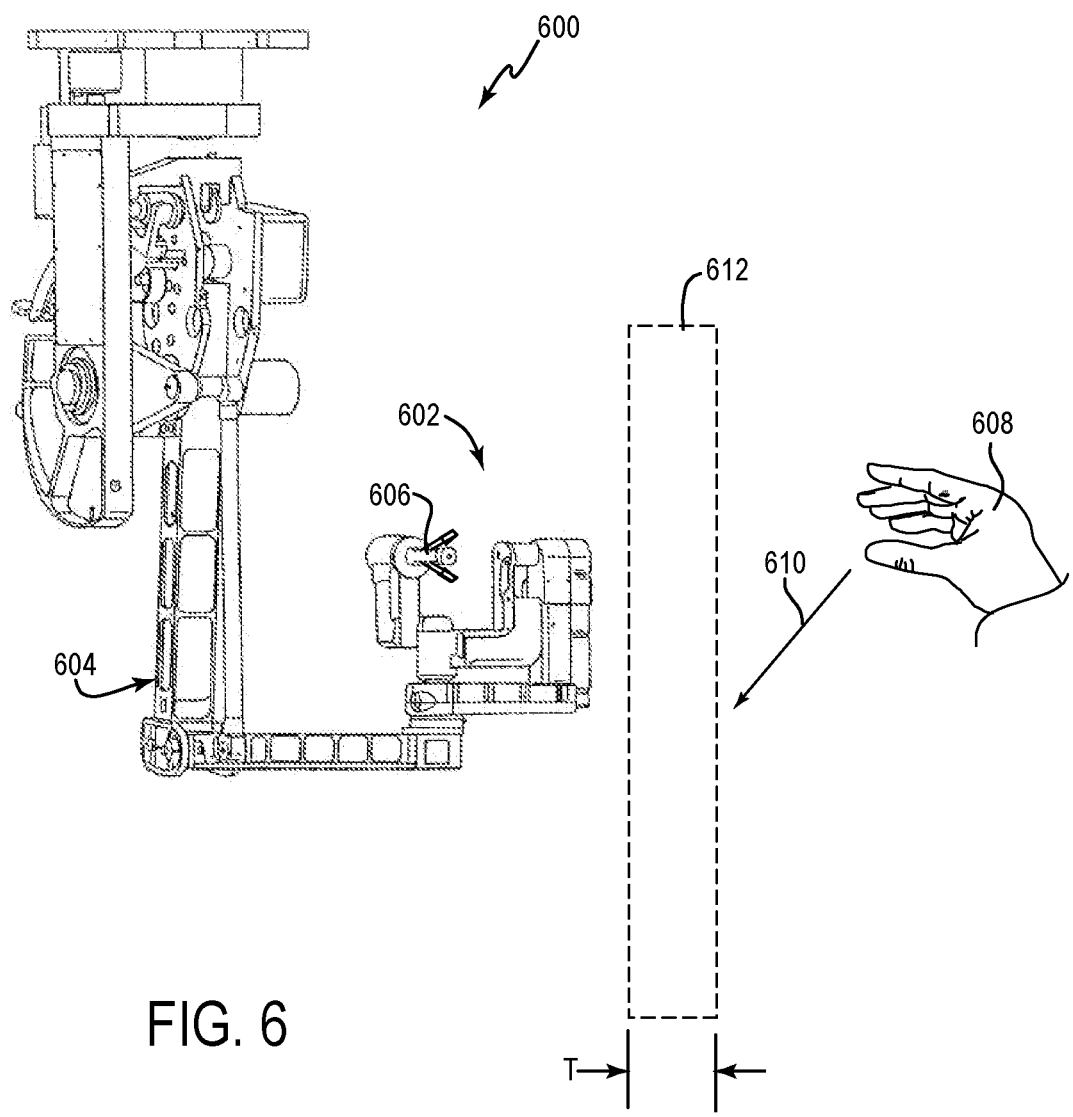
FIG. 6 is a perspective view of an example input mechanism and an example spatial boundary, according to some implementations.

FIG. 6 is a perspective view of an example input mechanism 600 and an example spatial boundary, according to some implementations. Input mechanism 600 includes a control input device 602 and a mechanical arm 604 which can be similar to any of various examples of the components described herein. Input mechanism 600 can be used in a user control system, e.g., a user control system 102, 200, 300, 400, or 700 having control input devices and mechanical arms as described above. In some examples, control input device 602 can be similar to other control input devices described herein, e.g., controller portion 800 of FIG. 8 (described below), and can control motion of one or more manipulator devices of manipulator system 104.

In the example of FIG. 6, control input device 602 is being operated by a user (not shown in FIG. 6), the user gripping the handle 606 of the control input device 602. Controlling mode is active to allow the control input device 602 to move a manipulator device. An object 608 is detected by object sensors of the user control system. For example, object 608 may have been detected within a threshold distance to the control input device 602 (or to another component of the user control system). In this example, object 608 is an unidentified object that is a hand of a person other than the user.

In some implementations, object 608 can first be detected externally to the workspace of control input device 602 using sensing fields of one or more external sensors, as object 608 approaches the user control system from a location external to the physical boundary of the components of the user control system. If object 608 enters the workspace of control input device 602, workspace sensors can detect the object. Thus, in some implementations, object 608 can be sensed using sensing fields of external sensors in conjunction with sensing fields of workspace sensors to follow an object moving from outside the workspace to inside the workspace, and/or an object moving from inside the workspace to outside the workspace. In other implementations, one object sensor can detect object 608 both inside the workspace and outside the workspace.

In the example of FIG. 6, object 608 is detected to have a trajectory away from control input device 602, as indicated by arrow 610. In some implementations, this trajectory can be determined based on detecting multiple positions of object 608 over time to determine a direction of the object and estimating that the direction will stay the same for further motion of object 608. In some examples, captured images or other forms of captured detections of object 608 from the object sensors can be examined to track the direction of object 608. In some implementations, the velocity of object 608 can also be determined from the history of object positions. In some implementations, the trajectory is considered to be away from the control input device 602 if the object is estimated to have a predicted trajectory that is outside a threshold range of trajectories that are directed toward the control input device 602 (e.g., a present location or a predicted future location of the control input device). In some examples, the threshold range of trajectories intersect the control input device within a particular spatial range around the control input device.

A spatial boundary 612 for the control input device is determined and created, the boundary having an determined location in space based on the distance of object 608 from a reference location of control input device 602, and/or based on other characteristics of object 608 such as the determined trajectory and/or velocity of object 608. If the control input device intersects this boundary, forces are output on the control input device by actuators of the user control system, e.g., actuators coupled to mechanical arm 604. In this example, spatial boundary 612 is shaped like a linear wall that is interposed between the control input device 602 and detected object 608. Spatial boundary 612 acts like a haptic wall which resists (e.g., prevents or reduces) movement of control input device 602 into and/or across (e.g., through and/or past) spatial boundary 612. For example, forces can be output on control input device 602 that oppose or resist its motion in a direction into and/or across spatial boundary 612 when the control input device 602 intersects the boundary. This prevents or reduces movement of control input device 602 into space that is closer to object 608 where the potential for collision between the control input device 602 and object 608 is higher.

Spatial boundary 612 can be defined at a particular distance from the object and/or at a particular distance from the control input device. For example, the particular distance can be measured between an object-facing edge of the spatial boundary and the detected object, such that as the object moves in a particular direction, the spatial boundary is moved in the same direction to maintain the particular distance. Spatial boundary 612 can be maintained to be located between the detected object and the control input device. In some implementations, the particular distance can vary, e.g., can be based on the current velocity of the object as described below.

Multiple separate or joined spatial boundaries, similar to spatial boundary 612, can be defined for respective multiple locations with reference to control input device 602 and/or mechanical arm 604. In some implementations, the forces of spatial boundary 612 slow down the motion of control input device 602 but do not stop the motion. This allows the user to be eased into reducing movement of the control input device without introducing an abrupt stop that may be disruptive to an ongoing procedure using control input device 602.

In some implementations, the controlling mode that is active for control input device 602 remains active when spatial boundary 612 is created and during the presence of the spatial boundary. This allows the user to continue operation of the control input device during a procedure without interruption while providing safety measures protecting against collision with the control input device. In some examples, if object 608 continues to move closer (e.g., within a closer, second threshold distance) of control input device 602, stronger forces can be output that resist or stop motion of control input device into and/or across spatial boundary 612.

In some implementations, controlling mode can be exited based on movement of control input device 602 with reference to the spatial boundary and/or under particular conditions. For example, controlling mode can be exited if the control input device is moved past the initial (first-encountered) edge of boundary 612 by a threshold distance.

In some implementations, the resisting forces for the spatial boundary can have a magnitude that allows the user to impel the control input device to overpower the forces, if desired. The resistive forces can have sufficient magnitude to inform the user of the barrier, so that the user will no longer try to move the control input device into and/or across the spatial boundary.

In some implementations, spatial boundary 612 has a particular thickness, e.g., thickness T as shown in the example of FIG. 6. In some examples, different magnitudes of resistive force can be output of the control input device at different distances or locations past the initial border of boundary 612, e.g., different locations across the thickness of the boundary. For example, resistive force magnitudes can be smaller at the contact of the control input device 602 with the near side border of spatial boundary 612, and the resistive force magnitudes can gradually, stepwise, or otherwise increase as the control input device continues to move through the barrier, reaching maximum resistive force at the far side border of the spatial boundary (e.g., closest to object 608). In some implementations, force magnitudes can be reduced for movement past the far side border of the boundary. In some implementations, different directions of force can be output on control input device 602 at different distances or locations past the initial border of boundary 612. For example, forces can push the control input device in a particular direction away from the object as the object moves.

In the example of FIG. 6, spatial boundary 612 is a linear boundary or has rectangular shape. In other implementations, spatial boundary 612 can take other forms, e.g., curved borders or edges, round or elliptical shape, irregular shape, discontinuous shape (e.g., gaps or sections of the boundary that are not associated with resistive forces), etc.

In various implementations, the user control system can check for various characteristics of the detected object to influence the generation and/or characteristics of spatial boundary 612. For example, it can be determined whether or not to create the spatial boundary based on these characteristics. The object characteristics can include location of the object and/or movement characteristics of the object, such a trajectory or velocity of the object. For example, if the object is moving along a trajectory within a threshold range of trajectories toward the control input device, spatial boundary 612 is generated. In another example, a velocity of the object can be determined, and if the velocity is below a particular velocity threshold (e.g., zero velocity or a very slow velocity), then spatial boundary 612 is generated. In another example, if the object is above a threshold size, then spatial boundary 612 is generated. Any combination of these characteristics can be detected and can be used to influence whether to create spatial boundary 612.

In additional examples, characteristics of spatial boundary 612 can be determined based on the characteristics of the object. For example, the location of the spatial boundary can be designated to be closer to the object and/or further from the control input device if the object velocity is higher than a threshold, and can be closer to the control input device when the object velocity is below the threshold. In another example, an object velocity that is very high, e.g., above a higher, second threshold, can cause the control input device to exit from controlling mode such that the spatial boundary is not created. In another example, a dimension or area of the spatial boundary can be based on the object velocity, e.g., a longer spatial boundary (e.g., vertical length and/or horizontal length) if the object velocity is above a threshold. In another example, a shape of the spatial boundary can be based on the object velocity, e.g., a straighter shape or convex shape if the object velocity is below a threshold, and a concave shape if object velocity is above the threshold, such that the concave shape may restrict the movement of control input device 602 to a greater extent than the straight or convex boundary. In another example, the thickness of the spatial boundary (as described above) can be based on the object velocity, e.g., larger thickness for velocities above a threshold compared to velocities below the threshold. In another example, a magnitude of the resistive forces associated with the spatial boundary can be based on the object velocity, e.g., a higher force magnitude for a larger object velocity above a threshold compared to lower object velocities below the threshold.

Similarly, location, dimension(s), shape, force magnitude, and/or thickness of spatial boundary 612 can be based on a predicted trajectory of the object. For example, if the object trajectory is predicted to be directly toward the control input device (e.g., within a threshold range of trajectories toward the control input device) based on past trajectories or movement of the object, the spatial boundary location can be located further away from the control input device, one or more spatial boundary dimensions can be larger, boundary thickness can be larger, and/or force magnitudes can be higher, than for object trajectories out of the threshold range (e.g., trajectories that are more tangentially directed with respect to the control input device).

In some implementations, characteristics of spatial boundary 612 can be additionally or alternatively based on one or more characteristics of the control input device. These characteristics can include velocity and predicted trajectory of the control input device. For example, the spatial boundary location can be defined further from the control input device, one or more spatial boundary dimensions can be larger, boundary thickness can be larger, and/or force magnitudes can be higher, for velocities of the control input device that are above a threshold and/or for predicted trajectories of the control input device that are out of a threshold range of trajectories toward the current or predicted location of the object.

In some implementations, one or more thresholds used to create and/or characterize the spatial boundary 612 can be dynamic, e.g., can be adjusted based on currently-sensed conditions of the physical environment surrounding the control input device and/or user control system besides the detected object. For example, the thresholds used for distance, velocity, and/or trajectory can be adjusted based on environmental conditions such as a control task requiring more complex motions of the control input device, a number of persons detected in the physical environment of the user control device, the frequency of persons moving in the physical environment (e.g., number of times that one or more persons are detected to walk by the user control system within a threshold range per time unit), the time of day (e.g., a time late in the workday may have user and persons more prone to mistakes), etc. Some of these conditions can be detected by the object sensors, for example. These conditions may be considered to increase the likelihood of a collision with an object, so that the thresholds can be changed to make activation of the spatial boundary easier to occur. For example, the threshold distance between control input device and object that triggers the spatial boundary can be larger, or the threshold velocity that triggers the spatial boundary can be higher, than if such conditions are not detected.

In any of the described implementations herein, haptic spatial boundaries similar to spatial boundary 612 can be determined on one or more sides of control input device 602 to limit the size of the effective workspace of control input device 602. In some implementations, such a limit to the workspace can be based on currently-sensed conditions in the physical environment similar to described above, e.g., to reduce the size of the workspace for safety.

FIG. 7 is a front elevational view of an example user control system 700 including object sensors and example external threshold regions, according to some implementations. Features described for user control system 700 can be used on any of the user control systems described herein.

User control system 700 includes a display unit 702 and control input devices 704, which, for example can be similar to corresponding components in other implementations described herein. Control input devices 704 can be moved within a workspace 706 that, for example, indicates their range of motion. In the implementation shown in FIG. 7, there is no ergonomic support nor guard rails surrounding or defining the workspace 706, allowing user control system 700 to fit into a smaller space in a physical environment. Ergonomic support(s) and/or guard rails can be provided in user control system 700 in other implementations.

User control system 700 includes object sensors similar to the other implementations of user control systems described herein. For example, one or more workspace sensors can be positioned at particular location(s) and have sensing fields covering workspace 706 (or portions thereof) and detect objects therein, as described with reference to FIGS. 2-6.

Object sensors that are external sensors are also provided at particular locations in this example of user control system 700. In some implementations, sensing fields of external sensors can be external to workspace 706 of the control input device(s) of the user control system 700. In other implementations, sensing fields of one or more external sensors can overlap and sense the workspace 706 or portions thereof. In some implementations, the sensing fields of one or more external sensors can overlap the sensing fields of one or more workspace sensors. Some workspace sensors and external sensors can have sensing fields that are adjacent, and/or can have partially overlapping sensing fields.

In this example, one or more of external sensors 710 and 712 can be located on the left side of vertical support 708 (e.g., base support 402 of FIG. 4), e.g., at upper and lower portions, respectively. External sensor 710 has a sensing field 714 and external sensor 712 has a sensing field 716. The sensing fields 714 and 716 sense regions that are external to and adjacent to surfaces of components on the left side of user control system 700. For example, sensing field 714 partially covers and/or is adjacent to portions of display unit 702 and portions of mechanical arm 709 and a platform 711 supporting a control input device 704. In another example, sensing field 716 partially covers and/or is adjacent to portions of platform 711 and portions of lower support base 713.

Objects that are positioned or moved within the sensing fields 714 and/or 716 are detected by the associated external sensors 710 and/or 712. The external sensors can sense the approach of objects in the sensing fields, from locations external to the user control system 700 toward the components of user control system 700. For example, a component can be collided with by an object approaching user control system 700, which may interfere with operation of control input devices 704.

Figure 10:
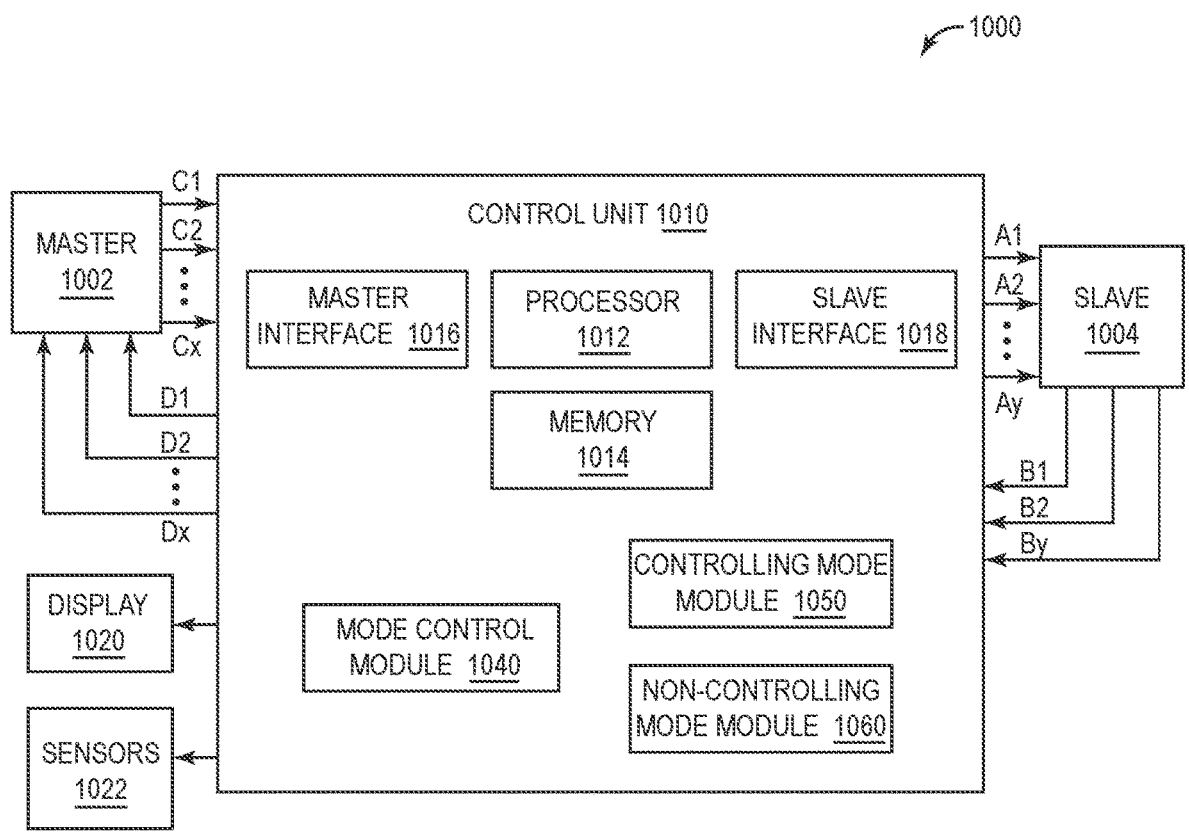
FIG. 10 is a block diagram of an example master-slave system which can be used in one or more implementations described herein.

If a detection of an object is made, the detecting external sensor(s) convey a signal and/or sensor data that indicates the detection to the control unit (such as a control unit shown in FIG. 10). Other sensor data may also be sent to the control unit, e.g., sensor data describing the sensed object or characteristics thereof (e.g., velocity or trajectory of the object).

The configuration of the sensing fields 714 and 716 allows detection of the presence of objects in the vicinity of the left side of user control system. In this example, sensors 710 and 712 provide sensing fields 714 and 716 that are directed to different and partially overlapping regions of space. For example, in some implementations, multiple object sensors can have overlapping sensor fields covering all or part of the same region of space. In some examples, this multiple sensor coverage can be used to more reliably detect objects, e.g., an object is considered detected if it has been detected in all of the overlapping sensing fields. Some implementations can provide sensing fields that are adjacent and/or do not overlap. In some implementations, a single sensor can provide multiple individual sensing fields, e.g., sensing fields 714 and 716 and/or additional sensing fields. In some implementations, a sensing field can be a combination of multiple individual sensing fields of multiple object sensors.

Similarly to external sensors 710 and 712, one or more of external sensors 720 and 722 can be located on the right side of vertical support 708, e.g., at upper and lower portions, respectively. External sensor 720 has a sensing field 724 and external sensor 722 has a sensing field 726. The sensing fields 724 and 726 sense regions that are external to and adjacent to surfaces of components on the right side of user control system 700. External sensors 720 and 722 can sense the approach of objects in the sensing fields 724 and 726, respectively, from locations external to the user control system 700 and external to the workspace of the control input devices 704, toward the components on the right side of user control system 700. For example, sensing fields 724 and 726 can cover regions of space on the right side of user control system 700 that correspond to regions on the left side covered by sensing fields 714 and 716, e.g., adjacent to the same or corresponding components of user control system 700.

In some implementations, external sensors can similarly be located and provide sensing fields in other directions and/or on other sides of user control system 700 (e.g., front, back, top, between sides, etc.). For example, one or more external sensors can be placed on display unit 702, or on an extended portion of vertical support 708 above display unit 702, that can sense adjacent external regions surrounding and to the rear of the user operating the user control system. In some implementations having ergonomic support or guard rails (e.g. as shown in FIGS. 2 and 4), external sensors can be located on these components with sensing fields directed external to the user control system 700. Multiple external sensors can have partially or fully overlapping sensing fields to provide redundant and more robust sensing of objects.

In some implementations, each sensing field 714, 716, 724, and/or 726 can be shaped as a cone. For example, sensing field 714 can have a particular width at the sensor 710 and increases in width in a direction away from the sensor 710, and a similar sensing fields can be provided by the other external sensors. Herein, the term "cone" or "conical" refers to an approximate cone shape, which does not necessitate an exact conical geometry, e.g., manufacturing tolerances, interference patterns, warps due to obstructions, or other allowances can be included in the conical sensing field. Furthermore, this term can refer to cones having circular cross sections, as well as or alternatively cross sections of other shapes, e.g., ellipses, ovals, rectangles, squares, triangles, etc. In some implementations, one or more sensing fields can be shaped as a cylinder, rectangle, or other shape. Each cone has a depth and volume limited by a sensing range of the associated sensor. In some implementations, the sensing field shape can be made wider or narrower, e.g., as appropriate to cover regions that are proximate to user control system 700, overlapping one or more components of user control system 700 and/or workspace 706, or other regions. In some implementations, a sensing field can be limited to a particular size, e.g., depth and/or volume, that may be less than the sensor capability of the object sensor. For example, the depth can be limited to a particular distance from the sensor at which the sensor is to detect objects in its sensing field. In some examples, the sensing field can be limited, e.g., in depth and/or volume, so that components (or portions thereof) of the user control system are not potentially erroneously detected as objects.

In some implementations, the user control system or a portion thereof can extend into one or more of the sensing fields of the object sensing system, e.g., into sensing fields 714, 716, 724, or 726 (or sensing fields of workspace sensors described in various implementations herein), such that one or more components of user control system 700 intersect one or more of the sensing fields. With some types of sensors, reflected signals caused by the components of the user control system 700 can be normalized such that the components are ignored and new objects located within the sensing field are detected by the sensors. In some implementations, the user control system 700 is not present in and does not extend into sensing fields of external sensors. With some types of sensors, e.g., that detect electromagnetic radiation signals reflected from an object in the sensing field, the user control system being external to the sensing fields allows only new objects present in the sensing field to reflect the signals.

In some implementations, portions of the sensing fields of any object sensors described herein can be blocked or adjusted in size or dimensions, e.g., by selecting particular settings of the sensors emitting the sensing fields. In some implementations, one or more of the sensors may be physically masked to block portions of the standard sensing field of the sensor from being sensed. In some examples, this may prevent the sensor from detecting components of the user control system 700 which are to be ignored.

Also shown in FIG. 7 are example external threshold regions that extend externally to the user control system 700 and which can be implemented to determine the triggering and activation of one or more functions of the user control system. In one example, a threshold region 730 is designated by the control unit of user control system 700 to surround all sides of user control system 700 at approximately a particular threshold distance from the user control system 700.

For example, the outer border of threshold region 730 can be defined at a threshold distance from one or more reference locations of the user control system 700. In some examples, a reference location can be at a component of the user control system, e.g., on a portion (e.g., surface) of a component that extends furthest away from a center (or vertical center axis) of the user control system. For example, a left or right edge of lower support base 713, or display unit 702, can be a reference location from which a threshold distance is measured for region 730 on each respective side of the user control system 700. In some examples, threshold region 730 can be centered on a location of user control system 700, e.g., the threshold distance can be measured from a center location on vertical support 708 or from a location in space between handles of control input devices 704.

The shape of external threshold region 730 can be any of a variety of different shapes. For example, region 730 can have a partial ellipsoid shape around user control system 700 as shown. Alternatively, the shape can be rectangular, conical, or irregular. In some implementations, at different portions of region 730, the threshold distance can be measured from different locations of user control system 700 (e.g., the nearest location), causing an irregular border of external threshold region 730.

In some examples, external threshold region 730 represents a region in which an object can be detected in the sensing fields of one or more object sensors of the user control system. The object sensors can be, for example, external sensors, workspace sensors, or both external sensors and workspace sensors used in conjunction. In some implementations, external threshold region 730 can be sensed in sensing fields of object sensors that can detect both workspace and external regions.

If an object is detected in external threshold region 730, a function of the user control system may be triggered and activated. In some examples, the function can be the output of a warning by the user control system to the user of the user control system and/or to the surrounding vicinity, e.g., to persons other than the user that are nearby. This warning indicates that an object (e.g., a person or other object) is close to the user control system and there is possibility of collision of the object with the user control system 700. For example, the warning can be output by the user control system, e.g., a visual message on a display, an audio alarm from speakers, forces output on a control input device 704, etc.

In some implementations, other functions may be triggered and activated by detection of an object in threshold region 730. For example, in some implementations, if an unidentified object is detected in the external threshold region 730, the user control system exits from controlling mode and activates a non-following mode as described herein. This is a safety function that anticipates possible collision of the object with a component of the user control system, that could cause undesired motion of a control input device 704 and thus undesired motion of a controlled manipulator device.

Multiple external threshold regions similar to region 730 can be simultaneously or alternatively created for use with user control system 700. In another example, an external threshold region 732 can be designated surrounding user control system 700. External threshold region 732 can be placed closer to user control system than region 730, e.g., having an outer border at a shorter threshold distance from a reference location of user control system 700 than region 730. One or more functions can be activated if an unidentified object is detected in region 732. In some implementations, detection of an object in region 732 can be used to activate a different function than the function activated via region 730. For example, detection of an object in region 730 can cause output of a warning as described above, and detection of an object in region 732 can cause a controlling mode of the control input devices 704 to be exited. Since the object is detected to be closer to user control system 700 in region 732 than in region 730 outside of region 732, the threat of collision is likely higher, and thus controlling mode is exited.

In some implementations, an exit of controlling mode is caused by a detection of an actual collision of the object with user control system 700, e.g., collision with any component of user control system 700. In some implementations, additional sensors can be provided on user control system 700 to detect such a collision, e.g., accelerometers or other motion sensors that can measure vibration caused by a collision. In some implementations, detections of objects in regions 732 or 730 prior to actual collision do not cause exiting of controlling mode.

In various implementations, the user control system can check for other characteristics of an object detected in region 730 and/or region 732 to inform the determination of whether to activate the associated function (e.g., output a warning, exit controlling mode, etc.). For example, a trajectory of the object can be determined, and if the object is moving along a trajectory toward the control input device within a threshold range of trajectories, the function can be activated. In another example, a velocity of the object can be determined, and if the velocity is above a particular velocity threshold, then the function can be activated. Any combination of these characteristics can be detected and can be used to influence whether to activate the function.

In some implementations, one or more thresholds for regions 730 and/or 732 used to activate associated functions of the user control system can be dynamic, e.g., can be adjusted based on currently-sensed conditions of the physical environment surrounding the user control system besides the detected object. For example, the threshold distance(s) used for external threshold regions 730 and/or 732 can be dynamic, thus providing these regions with a dynamic size and/or shape. In some examples, the threshold distance that defines external threshold region 730 can be adjusted based on environmental conditions such as a control task requiring more complex motions of the control input device, a number of persons detected in the physical environment, the distance from the user control system to other equipment in the physical environment (e.g., a display cart, manipulator system, operating table, etc.), the frequency of persons moving in the physical environment (e.g., number of times that one or more persons are detected to walk by the user control system within a threshold range per time unit), the time of day (e.g., a time late in the workday may have user and persons more prone to mistakes), etc. Some of these conditions can be detected by the object sensors, for example.

For example, external sensors can sense a portion of the surrounding environment and the system can determine from sensor data that a large number of persons (e.g., more than a threshold number of persons) are within a threshold distance of the user control system. Therefore there is a higher chance of collision by one or more persons with the user control system than if fewer persons were nearby. In response to this determination, the system can increase the threshold distance that defines the external threshold region 730, thus making region 730 larger than the previous region 730 so as to enable detecting a person at a greater distance from input mechanism 500 than when using the previous threshold distance.

Figure 8:
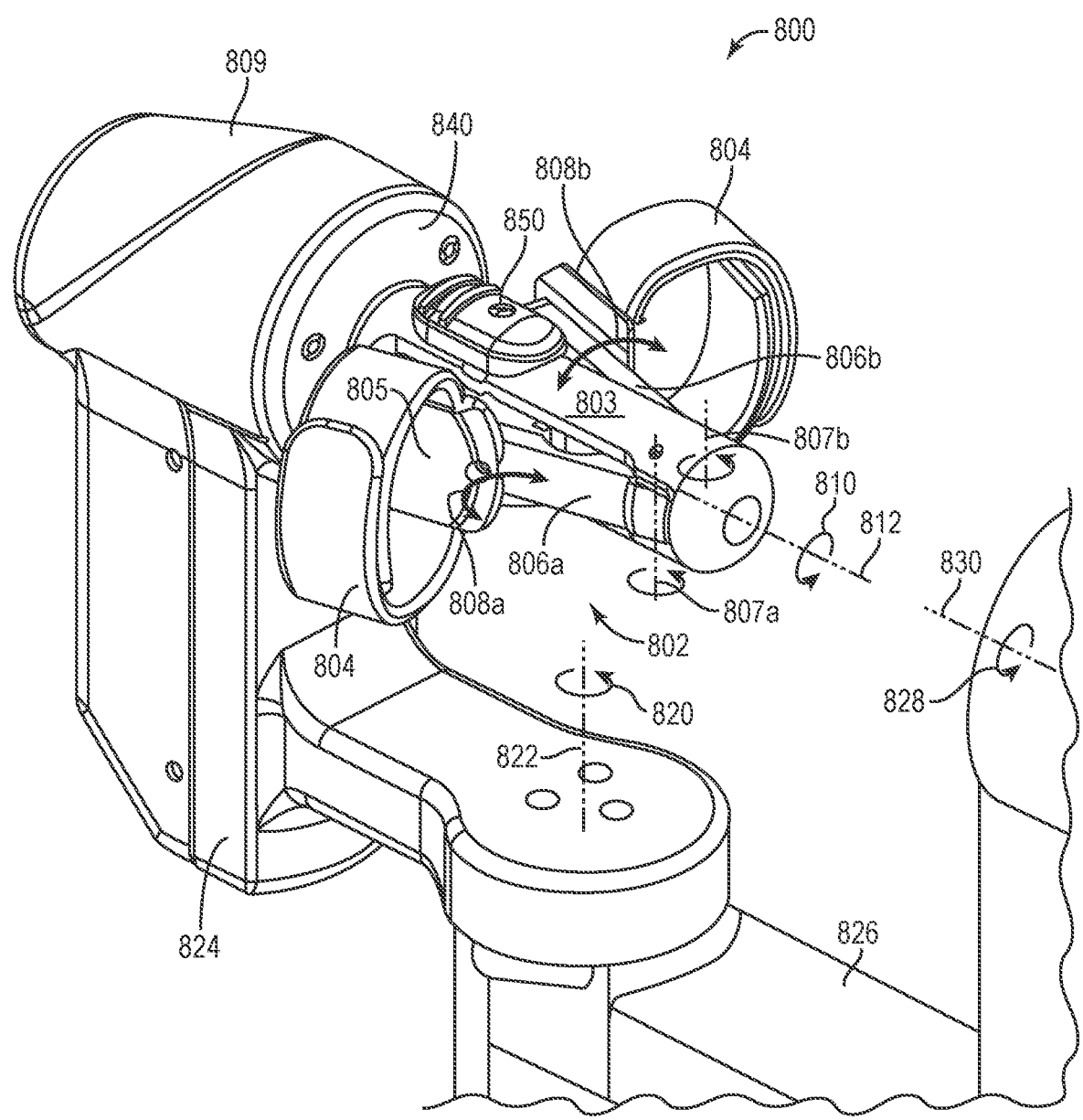
FIG. 8 is a perspective view of an example portion of a control input device which can be used in a user control system described herein, according to some implementations.

FIG. 8 is a perspective view of a controller portion 800 of an example control input device which can be used in one or more implementations described herein. Controller portion 800 can be used with any of the user control system implementations described herein. For example, controller portion 800 can be a portion of a control input device as described herein, e.g., control input device 210, 310, 450, 502, 602, etc. In other implementations of the user control systems described herein, other types or variations of control input devices can be used, e.g., that include other input devices such as a joystick, knob, mouse, trackball, touchpad, slider, etc.

Controller portion 800 includes a handle 802 which is contacted by a user to manipulate the control input device. Handle 802 includes a first end, a second end opposite the first end, and a central portion 803 extending between the proximal end and distal end. A central axis 812 is defined between the first and second ends. In this example, the handle 802 includes two grips that each include a finger loop 804 and a grip member 806 (grip members 806a and 806b). The two grip members 806 are positioned on opposite sides of central portion 803 of the handle 802, and the grip members 806 can be grasped, held, or otherwise contacted by a user's fingers. In this example, finger contacts 805 can be connected or formed at the unconnected end of the grip members 806a and 806b to provide surfaces to contact the user's fingers. Each finger loop 804 is attached to a respective grip member 806 and can be used to secure a user's fingers to the associated grip member 806. The user may also contact other portions of handle 802 while grasping the grip members 806.

Each grip member 806 and finger loop 804 can be moved in an associated degree of freedom 808 (e.g., 808a and 808b). In some examples, the grip members 806a and 806b are each coupled to the central portion 803 of the handle 802 at respective rotational couplings, allowing rotational movement of the grip members about grip axes 807a and 807b, respectively, with respect to the central portion 803. Each grip member 806a and 806b can be moved in an associated degree of freedom 808a about axis 807a and degree of freedom 808b about axis 807b, respectively, e.g., by a user contacting the grip members. For example, in some implementations the grip members 806a and 806b can be moved simultaneously in a pincher-type of movement (e.g., toward or away from each other). In various implementations, a single grip member 806 and finger loop 804 can be provided, or only one of the grip members 806 can be moved in the degree of freedom 808 while the other grip member 806 can be fixed with reference to the handle 802.

One or more grip sensors (not shown) can be coupled to the handle 802 and/or other components of the controller portion 800 and can detect the orientations of the grip members 806a and 806b in their degrees of freedom 808. The sensors can send signals describing sensed orientations and/or motions to a control unit as described herein. In some modes or implementations, the control unit can provide control signals to a manipulator device, e.g., manipulator system 104. For example, the orientations of the grip members 806a and 806b in degrees of freedom 808a and 808b can be used to control corresponding orientations, or any of various degrees of freedom, of an end effector of the manipulator system 104. Various implementations of the controller portion 800 can provide one or more active actuators (e.g., motors, voice coils, etc.), passive actuators (e.g., brakes) or springs to output forces on the grip members 806 in the degrees of freedom 808.

Handle 802 is also provided with a rotational degree of freedom 810 about a roll axis that in this example coincides with the central axis 812, defined between a first end and second end of the handle 802. The central axis 812 is a longitudinal axis in this example that extends approximately along the center of the central portion 803 of handle 802. Handle 802 can be rotated about central axis 812 with respect to a base member of the controller portion 800, such as housing 809. For example, a user can rotate the grip members 806 and central portion 803 as a single unit around the central axis 812, with respect to housing 809, to control a corresponding motion or other function of a manipulator device.

One or more sensors (not shown) can be coupled to the handle 802 to detect the rotation and/or orientation of the handle 802 in the rotational degree of freedom 810. For example, the sensor can send signals describing the orientation to a control unit which can provide control signals to the manipulator system 104 similarly as described above. For example, rotation of handle 802 in degree of freedom 810 can control a particular degree of freedom of an end effector of the manipulator system 104 that is different than a degree of freedom of manipulator system 104 controlled by degree of freedom 808 of the grip members 806. Some implementations of controller portion 800 can provide one or more actuators to output forces on handle 802 in the rotational degree of freedom 810. For example, a sensor and/or actuator can be housed in housing 809 and coupled to the handle 802 by a shaft extending through the central portion 803 of the handle 802.

In various implementations, the handle 802 can be provided with additional degrees of freedom. In some implementations, the controller portion 800 includes one or more gimbal mechanisms allowing multiple rotary degrees of freedom. For example, a rotational degree of freedom 820 about a yaw axis 822 can be provided to the handle 802 at a rotational coupling between an elbow shaped link 824 and a link 826, and the elbow shaped link 824 is coupled to the handle 802 (e.g., at housing 809). In this example, yaw axis 822 intersects and is orthogonal to the central axis 812. Additional degrees of freedom can similarly be provided. For example, link 826 can be elbow-shaped and a rotational coupling can be provided between the other end of link 826 and another link (not shown in FIG. 8). A rotational degree of freedom 828 about an axis 830 can be provided to the handle 802 at the rotational coupling. In some examples, the controller portion 800 can allow movement of the handle 802 within a workspace of the user control system 102 with a plurality of degrees of freedom, e.g., six degrees of freedom including three rotational degrees of freedom and three translational degrees of freedom. One or more additional degrees of freedom of the control input device can be sensed and/or actuated similarly as described above for the degrees of freedom 808 and 810. In some implementations, each additional degree of freedom of the handle 802 can control a different degree of freedom (or other motion) of an end effector of the manipulator system 104. Various degrees of freedom can control other functions, e.g., of manipulator system 104.

In the described example, handle 802 includes one or more control switches 850 or other type of input control (e.g., button, joystick, slider, trackball, sensor pad, etc.). In some implementations, the control switch 850 can be moved to various positions to provide particular command signals, e.g., to select functions, options, or modes of the user control system and/or control input device (e.g., selection of a controlling mode or non-controlling mode), to command a manipulator system or other system, etc.

In some implementations, handle 802 can include a presence sensing system including one or more presence sensors that can detect the presence of a user's hand operating the handle, detect the user's hand approaching or leaving the handle, detect a hand approaching or leaving the handle as well as a presence of the user's hand operating the handle, etc. In some examples, the presence sensor system can include sensors that sense contact with one or both grips 806, and/or have a sensing field that sense the presence of a user's hand contacting or close to the controller portion 800. In some implementations, the detection of a hand by the presence sensing system can be relayed to the object sensing system described herein, to assist in the detection and identification of sensed objects in sensing fields of object sensors. In some implementations, presence sensors provided on handle 802 (or other components of controller portion 800) can be used as object sensors as described herein.

In an example implementation, handle 802 is mechanically grounded, i.e., supported in space by a kinematic chain with an end stationary at mechanical ground, such as a floor, wall, or ceiling. For example, the housing 809 can be coupled to a mechanical linkage such as the mechanical arm 211 of FIG. 2 or mechanical arm 316 of FIG. 3, that is coupled to the ground or to a frame or other support connected to ground, providing a stable platform for the use of the controller portion 800.

In some examples, the base member can be coupled to a serial kinematic chain, the proximal end of which is mechanically grounded. The kinematic chain can include multiple members or links that are rotatably coupled to one or more other members or links of the chain, e.g., by rotational or linear couplings. The rotational axes of the chain can be sensed and/or driven by sensors and/or actuators. Some implementations can provide additional actuated and/or sensed motion of the kinematic chain, e.g., about axes extending lengthwise through one or more members. In some implementations, multiple members of the kinematic chain form a gimbal mechanism that allows the handle 802 to be rotated about the rotational axes of the chain. In some implementations, the handle 802 can also be translated in at least three linear degrees of freedom allowed by the kinematic chain. Some further examples of linkages and/or gimbal mechanisms that can be used with controller portion 800 are described in U.S. Pat. No. 6,714,839 B2, incorporated herein by reference.

In some implementations, controller portion 800, or a portion thereof, can be a mechanically ungrounded control input device which is free to move in space and is disconnected from ground. As used herein, a mechanically ungrounded control input device refers to a control input device that is unconstrained with respect to position and orientation motion in a working environment, and which is kinematically separated from the ground, e.g., not mechanically supported by the user control system (e.g., not supported by a frame or other support contacting the ground). The ungrounded controller portion 800 can be used within a defined region of space that is sensed by device sensors to determine the position and/or orientation of the controller portion, and can be sensed by object sensors as described herein to determine possible collisions of objects with controller portion 800. In some implementations, one or more object sensors for detecting potential colliding objects can be the same sensors as the device sensors that sensing the control input device. The sensors can having sensing fields covering portions within a cage, room, or other structure. Some implementations can use sensors coupled to other structures to sense the controller portion 800 within space, e.g., using image capture devices or other sensors that can detect objects and motion in 3D space, similarly as described above. In some implementations, a mechanically ungrounded control device may be in tethered or untethered connection with a control unit and/or one or more other components such as sensors, power supplies, etc. For example, the control device may be tethered, e.g., connected physically to these components via a cable or wire, or untethered, e.g., not physically connected to such components and in communication with the components via wireless communication signals sent and received by a wireless communication element provided in controller portion 800. In some implementations, ungrounded control input devices can be used while the user also views images displayed by any of the display units described herein. In such implementations, the object sensing system is useful to detect objects and potential collisions, since the user may not be aware of where his or her hands are in space while viewing images.

In some examples of ungrounded control input devices, one or more handles similar to handle 802 and/or grip members 806 can be coupled to a mechanism worn on a user's hand and which is ungrounded, allowing the user to move grips freely in space. For example, the positions of the grips relative to each other and/or to other portions of the handle can be sensed by a mechanism coupling the grips together and constraining their motion relative to each other. Some implementations can use glove structures worn by a user's hand. Some examples of ungrounded control input devices are described in U.S. Pat. No. 8,543,240 B2 (filed Sep. 21, 2010) and U.S. Pat. No. 8,521,331 B2 (filed Nov. 13, 2008), both incorporated herein by reference in their entireties.

Figure 9:
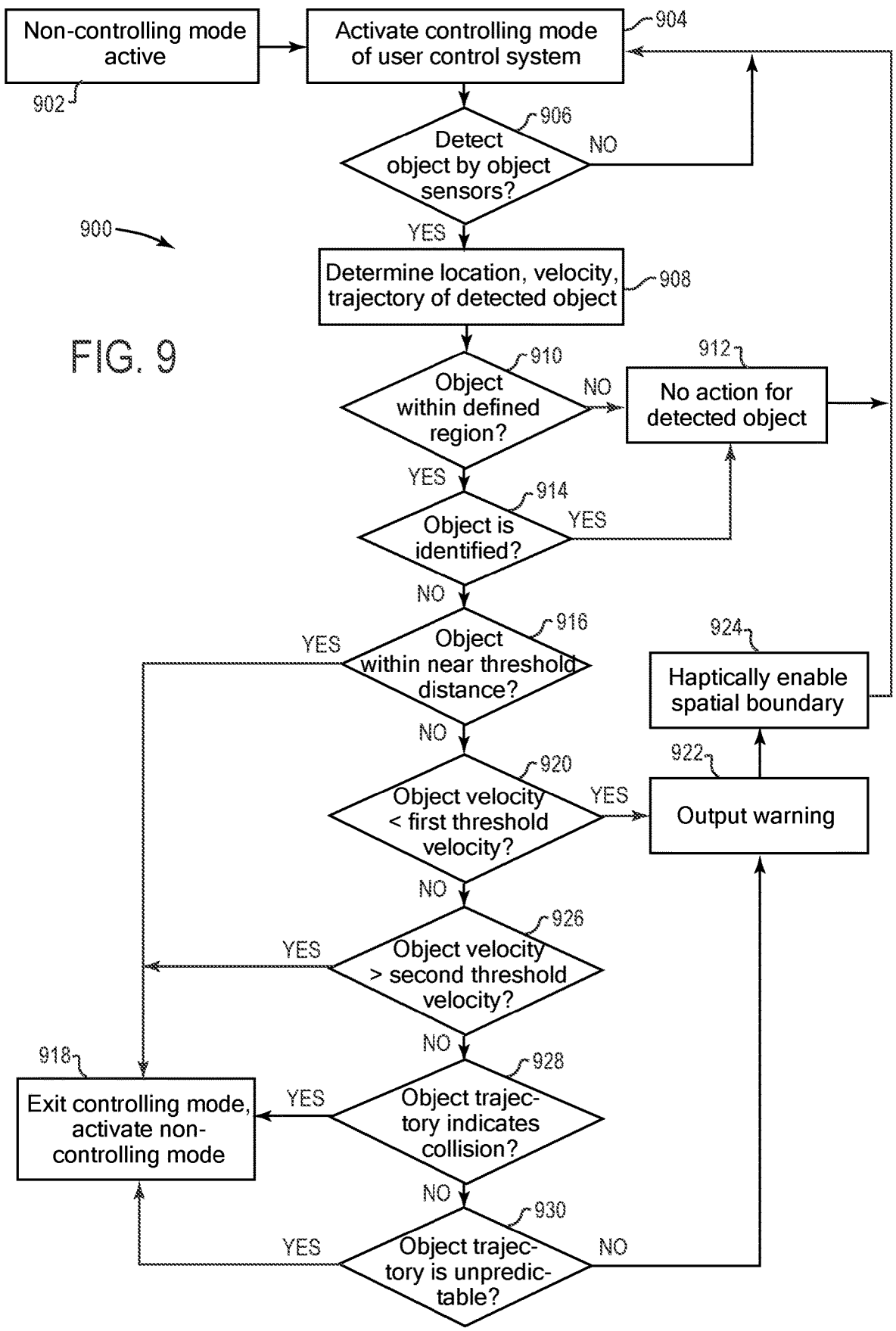
FIG. 9 is a flow diagram illustrating an example method to detect and mitigate potential collisions of an object with a user control system, according to some implementations.

FIG. 9 is a flow diagram illustrating an example method to detect and mitigate potential collisions of an object with a user control system, according to some implementations. Method 900 can, for example, be performed by a user control system, e.g., any of user control systems 102, 200, 300, 400, 700, etc. described herein. In some implementations, the method can be performed by a control unit component included in or coupled to the user control system. In some examples, the control unit can include one or more processors, e.g., microprocessors or other circuits, and some examples of which are described with reference to FIG. 10.

A single control input device is referred to in method 900 for explanatory purposes. Multiple control input devices can be similarly processed as described in method 900. A hand control input device that includes a handle is described in this example method, and other types of control input devices can be similarly processed as appropriate (e.g., if a control input device is not moveable or is only moveable in a limited manner such as a pedal, button, or dial, operations of method 900 that are related to such movement can be omitted as appropriate). Other implementations can use one or more features described herein with other types of systems, e.g., non-teleoperated systems, a virtual environment (e.g., medical simulation) having no physical manipulator system or slave device and/or no physical subject interacting with a manipulator system, etc.

Method 900 can be used to detect potential collisions of an object with the user control system. This can include collisions with the control input device of the user control system (including mechanical arms or links coupled to the control input device). Method 900 can also or alternatively be used to detect collisions of an object with the user control system as a unit, e.g., collisions with any component of the user control system that can be collided with by an object moving toward the user control system from external regions of space. For example, these components can include a display unit, supports, guard rails, frame, base, or housings or portions thereof, as well as control input devices and mechanical arms. In some implementations, these components can include a user who is operating the user control system. For example, a collision between an object and a housing of a display unit can vibrate the entire user control system and thus interfere with the manipulation (including user operation and/or location in space) of a control input device that is in controlling mode. In some implementations, a first set of elements including object sensors, sensing fields, sensed regions, thresholds, values, and/or parameters of the method 900 can be used for detection of potential collision with the control input device, and a second set of elements that includes one or more different elements than the first set can be used for detection of potential collisions with the user control system as a unit. In some implementations, some blocks of method 900, such as block 924, may be more relevant for use with potential collision with the control input device than with potential collision with other components of the user control system.

In block 902, a non-controlling mode of the user control system is active. The non-controlling mode can also be considered a "safe mode" in which the control input device is not enabled to provide control signals to a controlled device such as a manipulator device of manipulator system 104 if the control input device is moved by the user. For example, the manipulator system is disconnected from the control input device in non-controlling mode for commands that control movement of the manipulator system (and for commands for other manipulator system functions in some implementations, e.g., energy output or irrigation at an end effector, etc.). For example, the control input device can be manipulated by a user in non-controlling mode which will not cause any motion of a corresponding end effector of the manipulator system 104. The method continues to block 904.

In block 904, a controlling mode is activated for the user control system. Controlling mode allows the manipulations of the control input device to control functions of a controlled device of a manipulator system, e.g., manipulator system 104. For example, in a teleoperated system, the manipulations of the control input device can control corresponding motions, output functions (heat, electricity, etc.), and/or other functions of a manipulator device in controlling mode, such as moving an end effector in space, opening jaws of the end effector, outputting heat or other energy from the end effector, etc. In some implementations, controlling mode can be activated for a corresponding component of the manipulator system that is controlled by the control input device. In some implementations, feedback output from one or more components of the user control system can indicate to the user that controlling mode is active, e.g., visual output from display devices, audio output from audio devices, forces output on the control input device from motors, etc. In some implementations, controlling mode can be independently activate for each control input device based on conditions relevant to the respective control input device.

In some implementations, particular conditions have been detected that enable controlling mode to be activated in block 904. For example, the user typically commands the activation of controlling mode using one or more input devices of the user control system, e.g., a particular sequence of inputs at grips or buttons of the control input device. In some implementations, user presence at the user control system may be required to be detected at one or more presence sensors to indicate that the user is ready to operate the control device in controlling mode. For example, presence sensors can be located near a display device to detect when a user is viewing the display device during operation of the user control system. Presence sensors can be located on or near each control input device to detect that a user is grasping the handle of the control input device in an appropriate way for operation. The method continues to block 906.

In block 906, it is determined whether an object is detected by the object sensors of the object sensing system described herein. The object can be detected within or external to a defined region of interest of the user control system (as described below for block 908). For example, the object can be detected within or external to the workspace of the control input device and/or in regions of space located external to the workspace and external to the components of the user control system. The object sensors can include one or more sensors that have respective sensing fields that cover the workspace and/or regions of space.

If an object is not detected by the object sensors, then the method returns to block 904 to continue to make the controlling mode active for the control input device. If an object is detected by the object sensors, the method continues to block 908.

In block 908, one or more characteristics of the detected object are determined, including location and, in some implementations, movement characteristics. In some implementations, the movement characteristics include velocity and/or trajectory of the detected object. For example, a location of the detected object is determined, e.g., based on sensor data from the object sensors that indicates the location of the detected object with reference to a defined region of interest and/or with respect to known locations or components of the user control system. In some implementations, object sensor(s) can determine a distance from the respective sensor(s) to the object, and a location of the object can be determined based on the distance.

In some implementations, a velocity of the detected object can be determined in block 908. In various implementations, the determined velocity of the detected object can be the magnitude of velocity (speed), or can also include direction of movement of the object (which can be similar to trajectory of the object in some implementations). The velocity can be determined based on capturing multiple sensed spatial locations of the object over time. For example, an object sensor that includes an image capture device can capture multiple images of the object at time intervals as the object moves, and the velocity can be determined from the captured images. In another example, the velocity can be determined based on a difference of detected positions of the object over time, such as distances to a reference location (such the sensor performing the detection or a component of the user control system in the sensing field), indicating distance moved by the object over time. In some examples, a direction of the detected object is indicated by the determined velocity, e.g., a positive velocity indicates that the object is moving away from the sensor and a negative velocity indicates movement toward the sensor. Other types of sensors can similarly store multiple sets of location data captured and stored at particular time intervals describing the locations of the object, from which velocity of the object can be determined.

In some implementations, a velocity of the control input device can also be determined, e.g., in block 908. For example, the velocity of the control input device can be determined similarly to the velocity of the detected object, e.g., based on a history of spatial locations of the control input device over a particular time period previous to the current time.

A trajectory of the object can also be determined in block 908. In some implementations, a past trajectory of the object can be determined based on its past movement as indicated by multiple stored sensed spatial locations of the object over a time period (e.g., these stored locations may have been used in the determination of velocity of the object as described above). A predicted (future) trajectory of the detected object can be estimated based on the past trajectory, e.g., by extrapolating the past trajectory. In some implementations, an averaged trajectory of the object can be determined based on multiple past locations, velocities, and/or trajectories of the object.

In some implementations, a trajectory of the control input device can also be determined, e.g., in block 908. For example, a past trajectory of the control input device can be determined based on a history of spatial locations of the control input device over a particular time period previous to the current time, and a predicted trajectory can be estimated by extrapolating from the past trajectory. In some implementations, an average trajectory of the control input device can be determined similarly as for the object as described above.

In some implementations, determination of one or more movement characteristics of the detected object (and/or of the control input device) described for block 908 can be omitted, or can be performed later than block 908 in method 900, e.g., performed when needed. In some examples, the trajectories of object and/or control input device can be determined (if being used) when needed for block 924, 928, 930, or other block. Similarly, the velocity of the object and/or control input device can be determined (if being used) when needed for block 920, 926, or other block. The method continues to block 910.

In block 910, it is determined whether the detected object is located within a defined region of space with reference to the control input device, another component of the user control system, or other reference location(s). This determination can be based on the location of the object determined in block 908. In some implementations, the defined region can be a particular region of interest that includes the control input device and which is covered by sensing fields of the object sensors of the user control system, e.g., workspace sensors and/or external sensors. In some implementations, the defined region is smaller than the maximum sensed region of the object sensors (e.g., one or more sensors can sense past the boundaries of the defined region in directions away from the user control system). In some examples, the defined region can be a workspace of the control input device, and/or a workspace of multiple control input devices of the user control system. In further examples, the defined region can include the user control system (or portion thereof) and have borders that are a particular distance external to the physical boundary of the user control system or external to one or more particular components of the user control system (e.g., an outer housing of a component of the user control system). In some implementations, the defined region can be asymmetric or irregular in shape.

In some implementations, the defined region of space can be considered a "warning region" of space. If an object has been detected within the warning region, a warning is output by the user control system indicating the presence of the object. For example, the warning region can be defined by a warning distance threshold to a reference location, and the reference location is a control input device or other component of the user control system similarly as described above. In some implementations, the warning region can be determined as a separate region from the defined region. For example, the warning region can be smaller than the defined region and larger than the near region described below with respect to block 916.

If the object is not located within the defined region of space as determined in block 910, the method continues to block 912, in which no action is taken with reference to the detected object in method 900. In some implementations, the object is continued to be tracked and monitored by a control unit coupled to the user control system. The method returns to block 904 in which the controlling mode continues to be active.

If the object is located within the defined region of space as determined in block 910, the method continues to block 914, in which it is determined whether the detected object is an identified object. An identified object, as referred to herein, is a recognized component of the user control system having known location and characteristics. For example, identified objects can include a different control input device of the user control system that may be moved within the workspace of the control input device examined in method 900. Another example of an identified object is a moveable display unit, e.g., display unit 406 of FIG. 4 or a mechanism supporting such a display unit, that may be able to move near or into the defined region.

The user control system can determine whether the detected object is an identified object by one or more techniques. For example, the object sensing system can be used to detect, recognize, and track components of user control system. The shape, temperature, size, and/or other characteristics of the object can be detected, and sensor data describing the detected object is stored. Based on the object sensor data, the system can determine if the detected object is such a component of the user control system, which if true qualifies the object as an identified object. In various implementations, an object may be considered an identified object based on image analysis and feature recognition of captured images from the object sensors, based on a magnitude of object temperature being in a particular temperature range (e.g., to indicate a hand), and/or other characteristics.

In some implementations, spatial locations of particular components of the user control system are known based on kinematic information describing the physical shapes, physical dimensions, locations and/or motion of these components. For example, the control input devices, mechanical arms, and or display units of the user control system can include device sensors that detect the rotational orientations and/or translational positions of various mechanical links and other components of these components. Kinematic information describing the dimensions, shape, orientations, positions, and related motions are used by the control unit which can track the spatial locations of these components. The user control system can compare a spatial location and/or dimensions of the detected object to tracked spatial locations and dimensions of these components to determine whether the detected object is one of these components and thus is an identified object. Some implementations can utilize data from multiple sources, such as sensor data from the object sensors as well as tracked kinematic data for moveable components, to determine whether the object is an identified object.

In some implementations, known components of the user control system such as walls, guard rails, arm supports, support pillars or members, or portions of any of these, may be detected as objects. These components have static locations with reference to the sensed regions, and these static locations can be compared to the location of the detected object to assist in determining if the object is an identified object.

In some implementations, other objects can be considered identified objects. For example, a user's hand may be an identified object in some implementations, e.g., if the hand has been previously detected or scanned and has a stored physical configuration (e.g., shape, size, color, etc.) that can be compared to the detected object. A face, e.g., a particular face or designated user's face that has been recognized, can be considered an identified object in some implementations, as described above. In some implementations, if a face has been recognized and is considered an identified object, then two hands and other body parts can be considered identified objects and/or tracked, as described above.

Unidentified objects are those objects that are not identified objects to the object sensing system. For example, in some implementations, a hand of a user may be an unidentified object. A hand of a person who is not the user can be determined to be an unidentified object. Any other object not typically present in the workspace or near the control input devices, such as cell phones or other portable devices, cups or mugs, pens or pencils, etc., can be unidentified objects. In some implementations, detections from one or more presence sensing systems of the user control system can be used in conjunction with the object sensing system. For example, a presence sensing system of the control input device may be able to detect a distance of a user's hand from a handle of the control input device, and this distance can be used by method 900 to determine if the object detected by object sensors is the hand detected by the presence sensors. The presence sensor system can also be used to determine whether the hand should be considered an identified object. For example, in some implementations, if the presence sensing system considers the hand to be close enough to the control input device to allow controlling mode to be active, the object may be considered an identified object.

If the object is determined to be an identified object in block 914, the method continues to block 912, in which no action is taken with reference to the detected object. In some implementations, the object is continued to be tracked and monitored by the control unit. The method returns to block 904 in which the controlling mode continues to be active.

If the object is determined to be an unidentified object in block 914, the method can check whether one or more characteristics of the object satisfy conditions corresponding to those characteristics. Some examples of conditions are described with reference to blocks 916, 920, 926, 928, and 930, as well as the operations performed in response to those conditions being satisfied.

For example, the method continues to block 916, in which it is determined whether the detected object is located within a near threshold distance with reference to a reference location of the user control system. In some implementations, the near threshold distance defines a near region of space that is contained within and smaller than the defined region of space of block 910. The near region thus has borders closer to the reference location than the borders of the defined region. For example, the near threshold distance can be a particular distance to the reference location, and the reference location can be on the control input device, on another component of user control system, or at a location in space, e.g., centered between multiple control input devices. In some examples, the near threshold distance can be a distance to a handle of the control input device to define a threshold region, e.g., an example of which is shown in FIG. 5. In another example, the near threshold distance can be a particular distance to a the user control system or a particular component thereof (such as a surface of a display unit, support base, etc.), to define an external threshold region, e.g., an example of which is shown in FIG. 7. In some implementations, multiple different near threshold distances can be used, e.g., the near threshold distance can vary in different directions from the control input device or other reference location, and cover an asymmetric or irregular near region of space.

In some implementations, the near threshold distance can be zero. In such a case, if an object is detected within the near region, it is considered to have collided with the user control system. In some example implementations, a near threshold distance of zero can be used when detecting for collisions of objects with components of the user control system that are not a control input device. In some implementations, additional sensors can provide more robust sensing of such a collision to confirm that the collision sensed by the object sensors has occurred. For example, one or more accelerometers coupled to the user control system can sense vibration of the user control system to confirm that a collision has occurred.

If the unidentified object is located within a near threshold distance as determined in block 916, then the method continues to block 918, in which the controlling mode is exited and non-controlling mode is made active as described for block 902. For example, control of a manipulator device is disconnected from the control input device. Thus, an object within the near threshold distance is considered sufficiently close to the user control system as to be in danger of colliding with the user control system and potentially interfering with the operation of the control input device, such that controlling mode is exited. In some implementations, non-controlling mode can be made active in block 918 for all control input devices of the user control system. In some implementations, in response to controlling mode being exited in block 918, a warning that indicates the presence of the detected object can be output by the user control system to users and other persons, similar to that of block 922 (described below), and in some implementations the warning can indicate that the controlling mode has been exited.

If the unidentified object is not located within a near threshold distance as determined in block 916, then the method continues to block 920, in which it is determined whether the unidentified object is detected to be moving at a velocity that is less than a first threshold velocity. The first threshold velocity can be set relatively low, such that an object having a velocity below the first threshold velocity is not moving or is moving very slowly.

If the unidentified object is moving at a velocity below the first threshold velocity, then the method continues to block 922, in which a warning is output by the user control system. In some implementations, the warning (e.g., alert) can be an audible, visual, and/or haptic form of output to the user and/or other persons in the physical environment. The warning can indicate that an unidentified object is in the vicinity of the user control system (e.g., in the workspace of the control input device and/or near to a component of the user control system) and may collide with or interfere with operation of the control input device. Warnings can also be output at other times of method 900, in described examples. The method continues to block 924.

In block 924, one or more spatial boundaries to the control input device are haptically defined and enabled. In some implementations or cases, a spatial boundary can be defined with reference to the detected object, e.g., can be located a particular distance from and/or in a trajectory of the object. In some implementations or cases, a spatial boundary can be defined with reference to the control input device, e.g., can be located a particular distance from and/or in a trajectory of the control input device. A spatial boundary is a haptic barrier that, when the control input device moves into the defined barrier, causes an resistive force to be output on the control input device in a direction opposite to a direction toward the detected object, such that motion of the control input device is stopped or slowed toward the detected object. The resistive force is generated by one or more actuators coupled to the control input device and/or to a connected mechanical arm as described herein. In some implementations, the spatial boundary may reduce the effective workspace of the control input device.

In some implementations, the spatial boundary can have a width or thickness that creates different magnitudes and/or directions of force based on the distance that the control input device penetrates the spatial boundary, as described with reference to FIG. 6. In some implementations, the spatial boundary can be defined at a spatial location that is in the trajectory of the detected object as described for block 908. For example, the spatial boundary can be positioned such that the forces stop or resist the control input device from moving into a spatial location that intersects a predicted trajectory of the object.

The spatial boundary can be defined at a particular distance from the object and/or at a particular distance from the control input device, and can be maintained to be located between the detected object and the control input device. In some implementations, the particular distance can vary, e.g., can be based on the current velocity of the object and/or the current velocity of the control input device as determined for block 908. In some implementations, the spatial boundaries can be located in space based on the estimated trajectory of the detected object and/or the estimated trajectory of the control input device as determined for block 908. For example, a spatial boundary can be placed to intercept the trajectory of the detected object. Furthermore, the spatial boundaries can have characteristics based on the velocity of the detected object and/or control input device as described with reference to FIG. 6.

In some implementations, a smaller, second particular distance can be maintained between the control input device and the spatial boundary. For example, if the detected object has moved such that the distance between control input device and spatial boundary is less than the second particular distance, then the controlling mode can be exited as in block 918.

After enabling the spatial boundary, the method can then return to block 904 to continue activating controlling mode. Thus, the controlling mode can be maintained, e.g., allowed to remain active, during and after block 924. For example, the spatial boundary can be used to reduce or prevent collisions between the detected object and the control input device so that the controlling mode can remain in operation, thus avoiding an interruption in an active control procedure or task involving the user control system.

If the unidentified object is moving at a velocity greater than the first threshold velocity as determined in block 920, then the method continues to block 926 in which it is determined whether the object is detected to be moving at a velocity that is greater than a second threshold velocity. The second threshold velocity has greater magnitude than the first threshold velocity, and can have a relatively high magnitude such that an object moving at a velocity greater than the second threshold velocity is moving quickly.

If the unidentified object is moving at a velocity greater than the second threshold velocity, then the method continues to block 918, in which the controlling mode is exited and non-controlling mode is made active as described above. For example, an object moving at this high velocity can be considered to present a danger of collision with the user control system regardless of its trajectory (which may change quickly) and thus controlling mode is exited. In some implementations, non-controlling mode can be made active in block 918 for all control devices of the user control system. In some implementations, the second threshold velocity can be the same as the first threshold velocity and blocks 928 and 930 can be omitted.

If the unidentified object is not moving at a velocity greater than the second threshold velocity as determined in block 926, then the method continues to block 928, in which it is determined whether the object is detected to be moving along a trajectory that will likely cause it to collide with the user control system (e.g., collide with the control input device, or, in some implementations, with any component of the user control system). In some implementations, to determine whether such a future collision is likely, a range of likely trajectories of the object can be estimated, e.g., a range of trajectories within a threshold spatial range or angle of an averaged or other predicted trajectory, and if the control input device is positioned to intersect a trajectory within this range, an estimated collision is determined.

In some implementations, if a trajectory of the control input device has also been determined, then this trajectory can be used in a determination of whether a collision is likely between object and control input device. For example, a range of trajectories of the control input device can be estimated, e.g., within a threshold spatial distance or angle of an averaged or other predicted trajectory of the control input device, and if one or more trajectories of the control input device in the range intersects one or more trajectories in the range of object trajectories, a collision can be predicted. In some cases, it is determined to not use the trajectory of the control input device based on one or more characteristics of the object, e.g., the trajectory of the object and/or an estimated size of the object (as determined from sensor data). For example, if the detected object is external and approaching a component of the user control system that blocks the control input device from the object, then the trajectory of the control input device is not used (e.g., an object trajectory toward a back side or housing portion of the user control system).

In some implementations, the velocity of the detected object and/or the velocity of the control input device can be used in the determination of potential collision. For example, if the control input device is moving fast, it may not collide with the detected object as determined based on the velocities and trajectories of object and control input device. In some cases, it is determined to not use the velocity of the control input device based on one or more characteristics of the object, e.g., if the trajectory of the object indicates the object will collide with a different component of the user control system and not directly with the control input device. Other techniques can also or alternatively be used to determine whether a collision is likely to occur between the detected object and the user control system based on object trajectory and/or trajectory of the control input device.

If it is determined that the unidentified object is moving along a trajectory that will likely cause it to collide with the control input device or the user control system as determined in block 928, then the method continues to block 918, in which the controlling mode is exited and the non-controlling mode is made active as described above. For example, an object moving at a mid-range velocity (e.g., between the first threshold velocity and second threshold velocity) along a collision trajectory may be considered to be a danger sufficient to exit controlling mode. In some implementations, block 928 can be performed at a different point in method 900, e.g., before blocks 920 and 926. In some implementations, this earlier block 928 can check that the object velocity is above a particular threshold velocity in order to determine a positive result from block 928 to block 918.

If it is determined that the unidentified object is moving along a trajectory that will likely not cause it to collide with the control input device or user control system as determined in block 928, then the method continues to block 930, in which it is determined whether the object is detected to be moving along a trajectory that is unpredictable. In some implementations, an unpredictable trajectory can be determined if the detected object changes direction more than a threshold degree (e.g., change in angle) from a last detected position. In other examples, the trajectory can be considered unpredictable if the detected object changes direction by the threshold degree for more than a threshold amount of times, and the changes in direction occur within a particular time period.

If it is determined that the unidentified object is moving along a trajectory that is unpredictable as determined in block 930, then the method continues to block 918, in which the controlling mode is exited and the non-controlling mode is made active as described above. In this example, an object moving at this mid-range velocity (e.g., between the first threshold velocity and second threshold velocity) along an unpredictable trajectory may be considered to be a danger sufficient to exit controlling mode. In some implementations, block 930 can be performed at a different point in method 900, e.g., before blocks 920 and 926. In some implementations, this earlier block 930 can check that the object velocity is above a particular threshold velocity in order to determine a positive result from block 930 to block 918.

If the unidentified object is not moving in a trajectory that is unpredictable as determined in block 930, then the method continues to block 922, in which a warning is output as described above, and to block 924, in which one or more spatial boundaries are haptically determined and enabled as described above. For example, one or more spatial boundaries can be placed along the estimated trajectory of the detected object at a particular distance ahead of the object. Furthermore, the spatial boundaries can be located and/or can have characteristics based on the velocity of the detected object and/or the velocity of the control input device as described above. The method then returns to block 904 to continue activating controlling mode as described above.

The performance of block 924 indicates that, currently, a collision between object and control input device does not appear likely to occur based on the blocks of method 900, such that the spatial boundaries provide a safety measure to stop or slow the control input device in the vicinity of the object and/or prevent the control input device from getting close to the object. The spatial boundaries can be provided if the object does not impose an immediate and/or likely chance of collision, and to impede the motion of the control input device toward spatial locations that may cause a greater chance of collision with the object.

In some implementations, the system can enter additional or alternate states upon determining that the detected object presents a danger of collision with the user control system (e.g., a positive result of blocks 916, 926, 928, or 930). For example, in block 918, a hold or pause of the controlling mode can be performed instead of exiting controlling mode, such that, if the likelihood of collision is detected to reduce over a particular period of time, the controlling mode can be re-entered. In some implementations, if there is no immediate danger of collision, a time delay can be provided after a qualifying detection is made to exit controlling mode and activate non-controlling mode. For example, the time delay delays the exit of controlling mode and activation of the non-controlling mode by a particular amount of time to determine if object characteristics or other conditions change.

In some implementations, multiple types of warnings can be output by the user control system, and the appropriate type of warning of the multiple types is output at various blocks of method 900 to indicate the degree of danger that the object poses for collision with the user control system. For example, a particular type of warning can be output at some blocks of method 900 that indicates the presence of the object and that the object poses a lower danger of collision or interference than under other conditions. For example, such a warning can be for general awareness by the user and/or other persons near the user control system. In some examples, a warning can be output in block 912. In further examples, the detected object may be a person external to the user control system, and an audible warning can cause that person to be aware of their approach and closeness to the user control system while the controlling mode is active, thus allowing the person to change their movement to reduce or prevent interference or collision with the user control system.

In various implementations, the blocks described in the methods disclosed herein can be performed in a different order than shown and/or simultaneously (partially or completely) with other blocks, as appropriate. Some blocks can be performed for one portion of data and later performed again, e.g., for another portion of data. Not all of the described blocks need be performed in various implementations. In some implementations, blocks can be performed multiple times, in a different order, and/or at different times in these methods.

In some examples, blocks 910, 914, 916-920, and 926-930 can be performed in a different order and/or at least partially simultaneously. For example, block 914 can be performed earlier or later in method 900, e.g., after one of blocks 906, 908, or 916 to 928. For example, after a positive result is determined in block 920, 926, 928, or 930, the method can determine if the object is identified as described in block 914. If the object is determined to be an unidentified object, the next block (922 or 918) after these blocks is performed, and if the object is determined to be an identified object, no action is taken similarly to block 912. Alternatively, block 914 can performed at least partially simultaneously with one or more blocks, e.g., any of blocks 920, 926, 928, and 930. In some implementations, blocks 910, 914, and/or 916 may be omitted. In some implementations, one or more of blocks 920, 926, 928, and 930 may be omitted.

In some implementations or cases, one or more of blocks 920 and 924-930 can be omitted. For example, some implementations that detect for collisions of objects (such as persons) with any component of the user control system, and do not detect for direct collisions with the control input device, may omit one or more of these blocks. In some examples, block 924 can be omitted in scenarios in which an object collision may not occur with the control input device and may occur with one or more other components of the user control system.

As described above, in some implementations, method 900 detects an object in a sensing field of a sensor of a user control system, determines that the object is an unidentified object, and determines one or more characteristics of the object (e.g., location, velocity, trajectory, size, etc.). The method determines whether a characteristic of the object satisfies a condition that corresponds to the characteristic. For example, satisfying the corresponding condition can include satisfying a threshold that corresponds to the characteristic. In some examples, satisfying the threshold can include the object being located within a threshold distance of a reference location, the object having larger than a threshold velocity, the object being on a trajectory within a threshold range of collision trajectories, and/or, in some implementations, the object having larger than a threshold size. If such a condition is satisfied, a controlling mode of the control input device is exited (or, in some implementations, other operations can be performed as described in various examples herein, e.g., at blocks 922 and/or 924).

Some example implementations of method 900 follows.

In a first example implementation, objects are sensed for collisions directly with the control input device. The defined region of block 910 can be the workspace of the control input device. To determine if a sensed object is identified or unidentified in block 914, the object sensors are used to track control input devices in their sensing fields as well as track the object. A warning region is determined as a separate region within the defined region, and when the object is detected in the warning region, a warning is output to the user by the user control system. The near region of block 916 is smaller than the warning region and determined at a near threshold distance from the handle of the control input device, which is a shorter distance from the control input device. Blocks 918-928 can be implemented similarly as described above with reference to the control input device.

In a second example implementation, objects are sensed for collisions directly with the control input device similarly as described for the first example implementation. Instead of the object sensors tracking the locations of moveable control input devices and other moveable system components, kinematic data of these components is used to determine and track their locations in the workspace. The locations of the moveable system components are used to determine if the object is identified as one of the moveable objects, and if not, to determine whether one of these components may collide with the object.

In a third example implementation, objects are sensed for collisions with the user control system (e.g., any component of the system including display unit, frame, housing, or control input device(s)). For example, external regions that are external to and adjacent to the user control system are sensed for objects. The defined region of block 910 is a warning region adjacent to the user control system, e.g., a region a few feet from an outermost component of the user control system. When an object (e.g., a person) is detected in the warning region, a warning is output to by the user control system to the user and to the person. Detected objects are determined as unidentified in block 914, since the moveable components of the system (e.g., control input devices or moveable display unit) are not present in these external regions. The near region of block 916 is at a near threshold distance of zero or small distance. In some implementations of a near threshold distance of zero, an object detected in the near region indicates a collision of the object with the user control system (which can be confirmed with accelerometers on the user control system in some implementations).

In a fourth example implementation, objects are sensed for direct collisions with the control input device in its workspace and are also sensed for collisions with the user control system as a unit (e.g., collision with any component of the user control system). For example, one set of elements is used to detect potential collisions with the control input device, including a defined region (the workspace), warning region (defined by a warning threshold distance), near region (defined by a near threshold distance), first threshold velocity, and second threshold velocity. A different set of elements is used for detecting potential collisions with the user control system, including a different defined region (a region surrounding the system), a different warning region (defined by a different warning threshold distance), a different near region (defined by a different near threshold distance), and a different first and second threshold velocity. In some examples, blocks 920, 924, 928, and 930 can be omitted when detecting collisions with the user control system as a unit (such that the warning of block 922 is output in response to the object being detected within the warning region and outside the near region).

In a fifth example implementation, an object is detected in a sensing field of an object sensor of a user control system. A hand control input device is in a controlling mode in which movement of the handle in space activates one or more functions of a manipulator device in communication with the user control system. It is determined that the object is an unidentified object and that the object is within a threshold distance to the user control system. The controlling mode is exited so that movement of the control input device in space does not activate the one or more functions of the manipulator device. Controlling mode is exited in response to the object being an unidentified object and being within the threshold distance of the user control system. In some examples, the threshold distance to the user control system is a threshold distance to the control input device.

FIG. 10 is a block diagram of an example master-slave system 1000 which can be used with one or more features described herein. System 1000 includes a master device 1002 that a user may manipulate in order to control a slave device 1004 in communication with the master device 1002. In some implementations, master device 1002 can be, or can be included in, any of user control systems described herein. In some implementations, slave device 1004 can be, or can be included in, manipulator system 104 of FIG. 1. More generally, master device 1002 can be any type of device including a control input device that can be physically manipulated by a user. Master device 1002 generates control signals C1 to Cx indicating locations, states, and/or changes of one or more control input devices, e.g., in their degrees of freedom. The master device 1002 can also generate control signals (not shown) to control unit 1010 indicating selection of physical buttons and other manipulations by the user.

A control unit 1010 can be included in the master device 1002, in the slave device 1004, or in a separate device, e.g., an intermediary device between master device 1002 and slave device 1004. In some implementations, the control unit 1010 can be distributed among multiple of these devices. Control unit 1010 receives control signals C1 to Cx and generates actuation signals A1 to Ay, which are sent to slave device 1004. Control unit 1010 can also receive sensor signals B1 to By from the slave device 1004 that indicate positions, orientations, states, and/or changes of various slave components (e.g., manipulator arm elements). Control unit 1010 can include components such as a processor 1012, memory 1014, and interface hardware 1016 and 1018 for communication with master device 1002 and slave device 1004, respectively. Processor 1012 can execute program code and control basic operations of the system 1000, including functions related to processing sensor data from object sensors and other sensors and commanding modes and components as described herein. Processor 1012 can include one or more processors of various types, including microprocessors, application specific integrated circuits (ASICs), and other electronic circuits. Memory 1014 can store instructions for execution by the processor and can include any suitable processor-readable storage medium, e.g., random access memory (RAM), read-only memory (ROM), Electrical Erasable Read-only Memory (EEPROM), Flash memory, etc. Various other input and output devices can also be coupled to the control unit 1010, e.g., display(s) 1020 such as the display devices of the user control systems described herein. One or more sensors 1022 can include object sensors and device sensors as described herein, as well as other presence sensors detecting presence of a user operating the control input devices. Sensors 1022 can provide signals to control unit 1010 indicating detection of objects, detection of device movement, and/or user presence and/or values and parameters related to such detection.

In this example, control unit 1010 includes a mode control module 1040, a controlling mode module 1050, and a non-controlling mode module 1060. Other implementations can use other modules, e.g., a force output control module, sensor input signal module, etc. In some implementations, the modules 1040, 1050, and 1060 can be implemented using the processor 1012 and memory 1014, e.g., program instructions stored in memory 1014 and/or other memory or storage devices connected to control unit 1010. As used herein, the term "module" can refer to a combination of hardware (e.g., a processor such as an integrated circuit or other circuitry) and software (e.g., machine or processor executable instructions, commands, or code such as firmware, programming, or object code). A combination of hardware and software can include hardware only (e.g., a hardware element with no software elements), software hosted by hardware (e.g., software that is stored at a memory and executed or interpreted by or at a processor), or a combination of hardware and software hosted at hardware.

Mode control module 1040 can detect when a user initiates a controlling mode and a non-controlling mode of the system, e.g., by user selection of controls, sensing a presence of a user at a user control system or control input device, sensing required manipulation of a control input device, etc. The mode control module can set the controlling mode or a non-controlling mode of the control unit 1010 based on one or more control signals C1 to Cx.

In some implementations, controlling mode module 1050 may be used to control a controlling mode of control unit 1010. Controlling mode module 1050 can receive control signals C1 to Cx and can generate actuation signals A1 to Ay that control actuators of the slave device 1004 and cause corresponding components to follow the movement of master device 1002, e.g., so that the movements of slave device 1004 correspond to a mapping of the movements of master device 1002. Controlling mode module 1050 can also be used to control forces on the control input device of the master device 1002, e.g., forces output on one or more components of the control input device using one or more control signals D1 to Dx output to actuator(s) used to apply forces to the components, e.g., to the grip members of the control input device, in a rotary degree of freedom of the control input device, on arm links coupled to the control input device, etc. In some examples, control signals D1 to Dx can be used to provide force feedback, gravity compensation, etc.

In some implementations, a non-controlling mode module 1060 may be used to control a non-controlling mode of system 1000. In the non-controlling mode, movement in one or more degrees of freedom of master device 1002, or other manipulations of master device 1002, has no effect on the movement of one or more components of slave device 1004. In some implementations, non-controlling mode can include one or more other operating modes of the control unit 1010. For example, a selection mode allows movement of the control input device in one or more of its degrees of freedom and/or selection of the control switches of the control input device to control selection of displayed options, e.g., in a graphical user interface displayed by display 1020 and/or other display device. A viewing mode can allow movement of the control input device to control a display provided from cameras, or movement of cameras, that may not be included in the slave device 1004. Control signals C1 to Cx can be used by the non-controlling mode module 1060 to control such elements (e.g., cursor, views, etc.) and control signals D1 to Dx can be determined by the non-controlling mode module to cause output of forces on the control input device during such non-controlling modes, e.g., to indicate to the user interactions or events occurring during such modes.

Some implementations described herein, e.g., method 900, can be implemented, at least in part, by computer program instructions or code which can be executed on a computer. For example, the code can be implemented by one or more digital processors (e.g., microprocessors or other processing circuitry). Instructions can be stored on a computer program product including a non-transitory computer readable medium (e.g., storage medium), and the computer readable medium can include a magnetic, optical, electromagnetic, or semiconductor storage medium including semiconductor or solid state memory, magnetic tape, a removable computer diskette, a random access memory (RAM), a read-only memory (ROM), flash memory, a rigid magnetic disk, an optical disk, a memory card, a solid-state memory drive, etc. The media may be or be included in a server or other device connected to a network such as the Internet that provides for the downloading of data and executable instructions. Alternatively, implementations can be in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like.

The functional blocks, operations, features, methods, devices, and systems described in the present disclosure may be integrated or divided into different combinations of systems, devices, and functional blocks.

Although the present implementations have been described in accordance with the examples shown, there can be variations to the implementations and those variations are within the spirit and scope of the present disclosure. Accordingly, many modifications may be made without departing from the spirit and scope of the appended claims.

What is claimed is:

1. A user control system configured to communicate with a manipulator system, the user control system comprising:
   a control input device configured to be manipulated by an operator, the control input device being physically decoupled from the manipulator system; and
   a processor coupled to the control input device, the processor configured to perform a method comprising:
      detecting an object in a sensing field of a sensor while the control input device is in a controlling mode, wherein manipulation of the control input device in the controlling mode activates a function of the manipulator system, the function of the manipulator system selected from the group consisting of: movement of the manipulator system, electricity output, and heat output,
      determining that the object is unidentified,
      determining a first characteristic of the object, the first characteristic comprising at least one characteristic selected from the group consisting of: a location of the object relative to the user control system, a distance of the object to the user control system, a velocity of the object, a speed of the object, and a trajectory of the object,
      determining whether the first characteristic satisfies a first condition, and
      causing the control input device to exit the controlling mode in response to determining both that the object is unidentified and the first characteristic satisfies the first condition, so that manipulation of the control input device does not activate the function of the manipulator system.

2. The user control system of claim 1, wherein:
the first characteristic comprises the location of the object relative to the user control system or the distance of the object to the user control system, wherein the location of the object indicates the distance of the object to the user control system; and
the first condition comprises the distance of the object to the user control system being within a threshold distance.

3. The user control system of claim 2, wherein:
the distance of the object to the user control system is determined as a distance of the object to the control input device.

4. The user control system of claim 2, wherein:
the threshold distance is zero distance; and
determining that the first characteristic satisfies the first condition comprises: determining that the object has collided with the user control system.

5. The user control system of claim 1, wherein:
the sensing field covers a region of space external to a physical boundary of the user control system; or
the sensing field covers a workspace of the control input device.

6. The user control system of claim 1, further comprising:
a mechanical member coupled to the control input device; and
a device sensor coupled to the mechanical member, wherein sensor data from the device sensor comprises kinematic information.

7. The user control system of claim 1, wherein the method further comprises:
determining a spatial boundary relative to the object; and
causing the user control system to resist movement of the control input device into the spatial boundary toward the object.

8. The user control system of claim 7, wherein the method further comprises:
causing the control input device to exit the controlling mode in response to determining that the control input device has intersected the spatial boundary.

9. The user control system of claim 7, wherein determining the spatial boundary relative to the object comprises:
determining a location of the spatial boundary based on the velocity or speed of the object.

10. The user control system of claim 7, wherein:
determining the spatial boundary comprises determining a thickness of the spatial boundary based on the velocity of the object; and
causing the user control system to resist the movement of the control input device into the spatial boundary comprises causing the user control system to vary a magnitude of a resisting force based on the movement of the control input device across the thickness of the spatial boundary.

11. The user control system of claim 1, wherein:
the first characteristic comprises the velocity of the object or the speed of the object;
the first condition comprises the velocity of the object not exceeding a velocity condition or the speed being below a threshold speed; and the method further comprises, in response to the first characteristic satisfying the first condition, determining a spatial boundary relative to the object and resisting movement of the control input device into the spatial boundary toward the object.

12. The user control system of claim 1, wherein:
the first characteristic comprises the trajectory of the object;
the first condition comprises the trajectory of the object being outside a threshold range of trajectories; and
the method further comprises, in response to the first characteristic satisfying the first condition, determining a spatial boundary relative to the object and resisting movement of the control input device into the spatial boundary toward the object.

13. The user control system of claim 1, wherein:
the control input device includes a handle manipulable by a hand of a user and moveable in one or more degrees of freedom; or
the control input device includes a foot control manipulable via contact with a user's foot.

14. A method of operating a user control system, the method comprising:
detecting an object in a sensing field of a sensor while a control input device of the user control system is in a controlling mode, wherein manipulation of the control input device in the controlling mode activates a function of a manipulator system communicatively coupled to the user control system, the control input device configured to be manipulated by an operator, the control input device being physically decoupled from the manipulator system, the function of the manipulator system selected from the group consisting of: movement of the manipulator system, electricity output, and heat output;
determining that the object is unidentified;
determining a first characteristic of the object, the first characteristic comprising at least one characteristic selected from the group consisting of: a location of the object relative to the user control system, a distance of the object to the user control system, a velocity of the object, a speed of the object, and a trajectory of the object;
determining whether the first characteristic satisfies a first condition; and
causing the control input device to exit the controlling mode in response to determining both that the object is unidentified and the first characteristic satisfies the first condition, so that manipulation of the control input device does not activate the function of the manipulator system.

15. The method of claim 14, wherein:
the first characteristic comprises the location of the object relative to the user control system or the distance of the object to the user control system, wherein the location of the object indicates the distance of the object to the user control system; and
the first condition comprises the distance of the object to the user control system being within a threshold distance.

16. The method of claim 14, further comprising:
determining a spatial boundary relative to the object; and
causing the user control system to resist movement of the control input device into the spatial boundary toward the object.

17. The method of claim 16, wherein determining the spatial boundary relative to the object comprises:
determining a location of the spatial boundary based on the velocity or speed of the object.

18. The method of claim 16, wherein:
determining the spatial boundary comprises determining a thickness of the spatial boundary based on the velocity of the object; and
causing the user control system to resist the movement of the control input device into the spatial boundary comprises: causing the user control system to vary a magnitude of a resisting force based on the movement of the control input device across the thickness of the spatial boundary.

19. A non-transitory machine-readable medium comprising a plurality of machine-readable instructions which when executed by one or more processors associated with a user control system are adapted to cause the one or more processors to perform a method comprising:
detecting an object in a sensing field of a sensor while a control input device of the user control system is in a controlling mode, wherein manipulation of the control input device in the controlling mode activates a function of a manipulator system communicatively coupled to the user control system, the control input device configured to be manipulated by an operator, the control input device being physically decoupled from the manipulator system, the function of the manipulator system selected from the group consisting of: movement of the manipulator system, electricity output, and heat output;
determining that the object is unidentified;
determining a first characteristic of the object, the first characteristic comprising at least one characteristic selected from the group consisting of: a location of the object relative to the user control system, a distance of the object to the user control system, a velocity of the object, a speed of the object, and a trajectory of the object;
determining whether the first characteristic satisfies a first condition; and
causing the control input device to exit the controlling mode in response to determining both that the object is unidentified and the first characteristic satisfies the first condition, so that manipulation of the control input device does not activate the function of the manipulator system.

20. The non-transitory machine-readable medium of claim 19, wherein:
the first characteristic comprises the location of the object relative to the user control system or the distance of the object to the user control system, wherein the location of the object indicates the distance of the object to the user control system; and
the first condition comprises the distance of the object to the user control system being within a threshold distance.

* * * * *